United States Patent
Kreang-Arekul et al.

(10) Patent No.: US 7,650,044 B2
(45) Date of Patent: Jan. 19, 2010

(54) METHODS AND SYSTEMS FOR INTENSITY MATCHING OF A PLURALITY OF RADIOGRAPHIC IMAGES

(75) Inventors: Somchai Kreang-Arekul, San Mateo, CA (US); Leon Kaufman, San Francisco, CA (US)

(73) Assignee: Cedara Software (USA) Limited, Irvine, CA (US)

( * ) Notice: Subject to any disclaimer, the term of this patent is extended or adjusted under 35 U.S.C. 154(b) by 978 days.

(21) Appl. No.: 11/067,594

(22) Filed: Feb. 25, 2005

(65) Prior Publication Data

US 2005/0213849 A1  Sep. 29, 2005

Related U.S. Application Data

(63) Continuation-in-part of application No. 10/005,473, filed on Nov. 6, 2001, now Pat. No. 7,127,090.

(60) Provisional application No. 60/550,215, filed on Mar. 4, 2004, provisional application No. 60/308,997, filed on Jul. 30, 2001.

(51) Int. Cl.
  G06K 9/00 (2006.01)
  G06K 9/40 (2006.01)
(52) U.S. Cl. .................. 382/274; 382/128; 382/132
(58) Field of Classification Search .......... 382/128, 382/130–133, 218, 274, 284; 378/4, 10, 378/207; 600/420
See application file for complete search history.

(56) References Cited

U.S. PATENT DOCUMENTS

| | | | |
|---|---|---|---|
| 5,111,045 A | 5/1992 | Konno et al. | |
| 5,130,541 A | 7/1992 | Kawai | |
| 5,325,293 A | 6/1994 | Dome | |
| 5,528,492 A | 6/1996 | Fukushima | |
| 5,549,117 A | 8/1996 | Tacklind et al. | |
| 5,570,404 A | 10/1996 | Liang et al. | |
| 5,687,306 A | 11/1997 | Blank | |
| 5,986,279 A | 11/1999 | Dewaele | |
| 6,049,622 A | 4/2000 | Robb et al. | |
| 6,083,162 A | 7/2000 | Vining | |
| 6,097,418 A | 8/2000 | Larsen et al. | |
| 6,195,471 B1 | 2/2001 | Larsen | |
| 6,273,606 B1 | 8/2001 | Dewaele et al. | |
| 6,750,873 B1 | 6/2004 | Bernardini et al. | |
| 2002/0008697 A1 | 1/2002 | Deering | |
| 2002/0012004 A1 | 1/2002 | Deering | |
| 2002/0114536 A1 | 8/2002 | Xiong et al. | |
| 2003/0026469 A1 | 2/2003 | Kreang-Arekul et al. | |
| 2003/0053136 A1 | 3/2003 | Chang | |
| 2003/0063383 A1 | 4/2003 | Costales | |
| 2003/0179923 A1 | 9/2003 | Xiong et al. | |
| 2003/0206179 A1 | 11/2003 | Deering | |
| 2003/0209662 A1 | 11/2003 | Nelson et al. | |
| 2003/0209672 A1 | 11/2003 | Nelson et al. | |
| 2004/0008810 A1 | 1/2004 | Nelson et al. | |
| 2004/0263790 A1 | 12/2004 | VanOverloop et al. | |
| 2005/0129299 A1 | 6/2005 | Kreang-Arekul et al. | |

*Primary Examiner*—Duy M Dang
(74) *Attorney, Agent, or Firm*—Michael Best & Friedrich LLP

(57) ABSTRACT

Methods and systems for intensity/brightness matching of a plurality of radiographic images. Software can be used to provide various stitching and blending methods to join first and second images into a composite, larger image before or after the intensity/brightness of the radiographic images are modified.

7 Claims, 28 Drawing Sheets

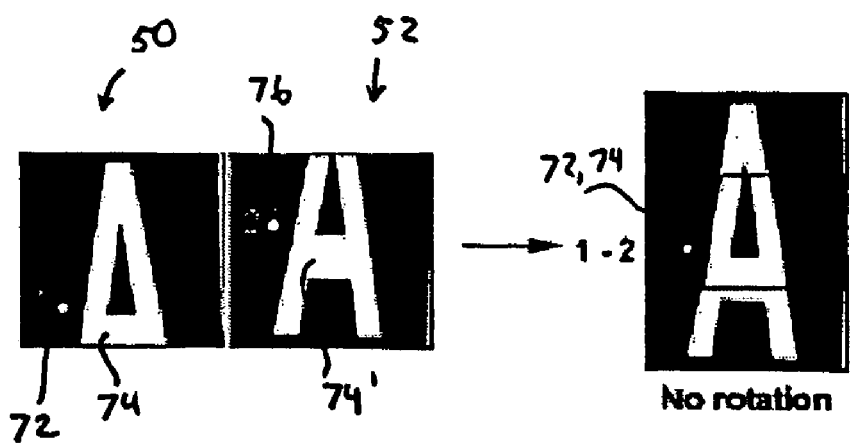
FIGURE 6A
FIGURE 6B
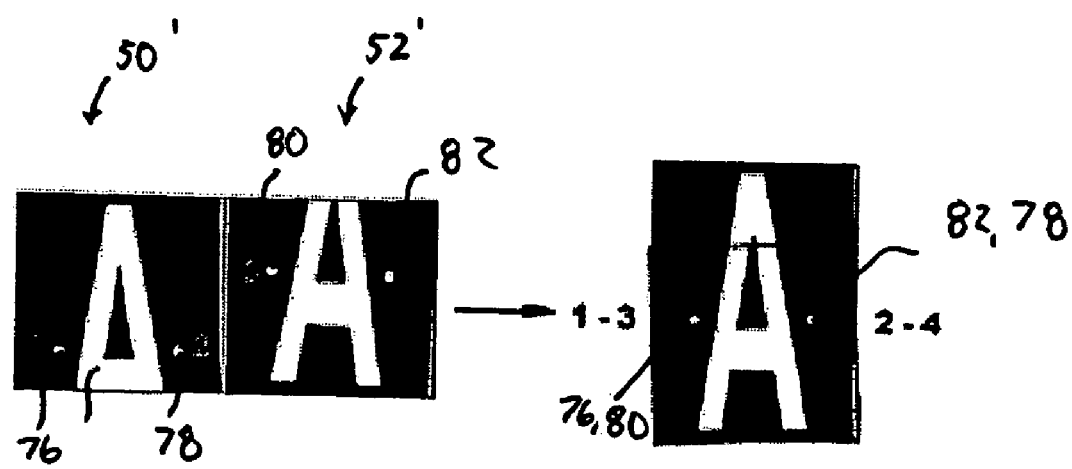
FIGURE 7A
FIGURE 7B

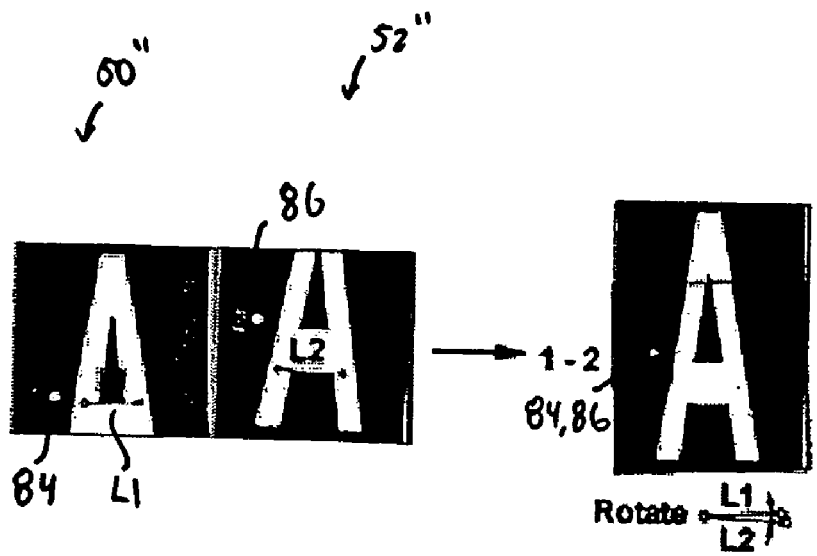
FIGURE 8A
FIGURE 8B
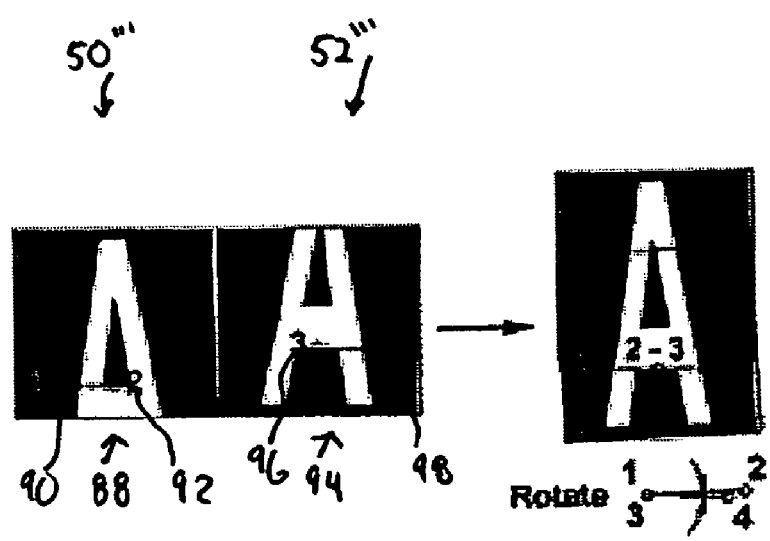
FIGURE 9A
FIGURE 9B

```
┌─────────────────────────────────────────────────────────────────┐
│ Place object(s) of known, equal absorption adjacent subject tissue │
│   so that at least one object will appear in each of the images that │
│                    are to be stitched                            │
└─────────────────────────────────────────────────────────────────┘
                                │
┌─────────────────────────────────────────────────────────────────┐
│          Obtain a plurality of images of the subject tissue      │
└─────────────────────────────────────────────────────────────────┘
                                │
┌─────────────────────────────────────────────────────────────────┐
│    Set a region of interest over each of the objects in each of the │
│   images to measure the average intensity of the object/region of │
│                            interest                              │
└─────────────────────────────────────────────────────────────────┘
                                │
┌─────────────────────────────────────────────────────────────────┐
│   Compare the measured intensity level of the objects and use the │
│      comparison to generate a scaling factor, wherein the scaling │
│    factor will adjust the intensity of the objects in each of the images │
│         so as to have substantially the same intensity level.    │
└─────────────────────────────────────────────────────────────────┘
                                │
┌─────────────────────────────────────────────────────────────────┐
│           Apply the scaling factor to the pixels of the image    │
└─────────────────────────────────────────────────────────────────┘
```

FIG. 13

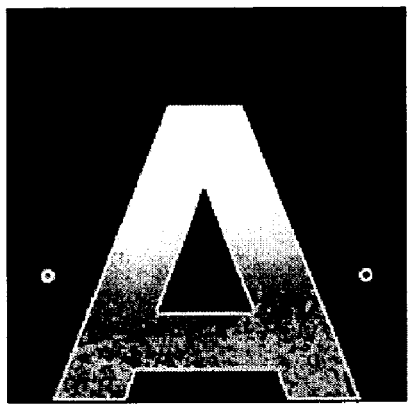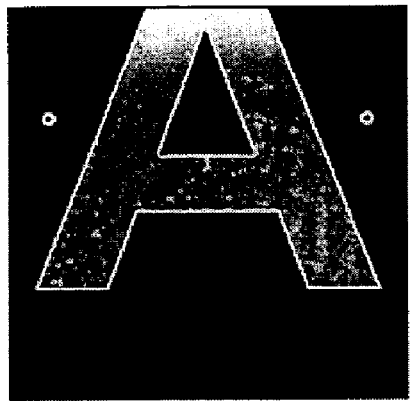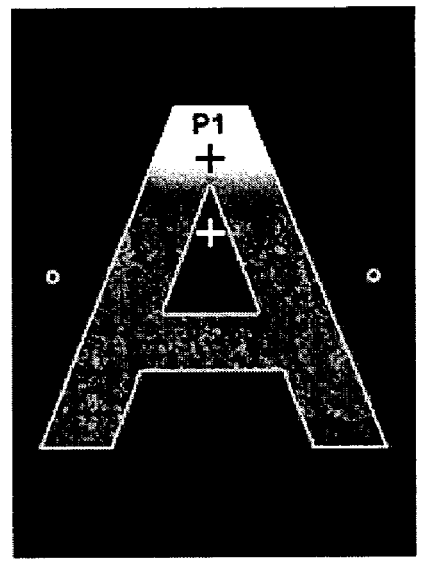
Offset = 0
Gain = 1
FIG. 20B

METHODS AND SYSTEMS FOR INTENSITY MATCHING OF A PLURALITY OF RADIOGRAPHIC IMAGES

CROSS-REFERENCES TO RELATED APPLICATIONS

The present invention claims benefit to U.S. Provisional Patent Application Ser. No. 60/550,215, filed Mar. 4, 2004, entitled "Methods and Systems for Combining the Display Intensities of a Plurality of Radiographic Images," the complete disclosure of which is incorporated herein by reference. The present invention is also a continuation-in-part of U.S. patent application Ser. No. 10/005,473, filed Nov. 6, 2001, now U.S. Pat. No. 7,127,090, entitled "Methods and Systems for Combining a Plurality of Radiographic images," which claims benefit of U.S. Provisional Patent Application Ser. No. 60/308,997, filed Jul. 30, 2001, entitled "Methods and Systems for Combining a Plurality of Radiographic Images," the complete disclosures of which are incorporated herein by reference.

The present invention is also related to U.S. patent application Ser. No. 09/908,466, filed Jul. 17, 2001, now U.S. Pat. No. 6,901,277, the complete disclosure of which is incorporated herein by reference.

BACKGROUND OF THE INVENTION

The present invention relates generally to stitching two or more images. More specifically, the present invention provides methods, systems, and software for modifying a signal intensity of one or more images before or after they are stitched.

In the medical imaging field, oftentimes the field of view of the imaging devices is smaller than the anatomy being examined. Consequently, two or more individual radiographic projection images (hereinafter referred to as "projection images" or "images") need to be obtained and then properly assembled to form the appropriate field of view for analysis. Such assembly of the images is referred to hereinafter as "stitching."

The need for stitching is encountered in many digital radiography, MRI, ultrasound, and nuclear medicine evaluations, all techniques that are capable of imaging along an axis of possible motion. Unfortunately, stitching of the images is not always straightforward. Because it is not always known how much the patient or the imaging device has moved or how much the patient shifts or rotates between image shots, accurate stitching of the individual images often proves difficult. Thus, flexibility of the stitching the images is desirable.

A stitched image is made up of two or more images, arranged so as to match anatomic features of interest. FIG. 1A illustrates one imaging device 12 that comprises an x-ray source and a plurality of overlapping image plates that are used to obtain a plurality of projection images that are stitched together to form a full image of the subject tissue (e.g., leg/spine image). In general, the intensity scale is assumed to be the same in all the individual projection images that are used in the stitched image. For example, U.S. Pat. Nos. 6,273,606, 6,195,471, 6,097,418 and 5,986,279 relate to stitching images, but none of these patents deal with signal intensity differences between the plurality of projection images.

There are two commonly used intensity scales in image display. One intensity scale sets a Window and a Level (W and L). For example, in an intensity scale of 0-32,000, the features of interest may only occupy the signal intensity region between 5,000 and 7,000. Typically, it is desirable to use the full display scale (which may be only 256 or 512 levels of gray) to show the brightness of only the range of interest. In this case, the operator will set L=6,000 and W=2,000, so that the center of the window is at 6,000 and the range is ±1,000, i.e., from 5,000 to 7,000. By this scheme, an intensity of 5,000 is mapped to zero (or minimum brightness) and an intensity of 7,000 is mapped to maximum brightness for that particular projection image.

Another intensity scale includes an upper and lower level (U and L). As the name implies, L selects the image intensity value that will mapped as 0 intensity in the display and U selects the image intensity value that will be mapped as maximum in the display. In the example above, for this intensity scale, L would equal 5,000 and U would equal 7,000 for this intensity scale.

As can be appreciated, there exist other intensity scales, some non-linear, some reversing scales, and the present invention is not limited to the particular intensity scale used to map image intensity. Changing the bounds of the intensity scales is referred to herein as "windowing" or changing a "windowing scale."

There are various reasons why the individual images can have non-matching intensity scales, e.g., why the same anatomic landmark in an overlap area may be more intense in one image than the other. For example, if the x-ray images are acquired by separate exposures, there can be differences in the x-ray tube settings and/or performance. Even if the plurality of images are acquired in a single exposure, however, each detecting plate of the x-ray imaging device may have a somewhat different sensitivity, or the settings of the digitizer can vary. Such intensity variations are referred to herein as "uncontrolled variations."

There is another reason why the same anatomic landmark in an overlap area may be more intense in one image than the other. For example, consider the best case scenario, in which a single exposure with perfectly matched plates and a stable digitizer is used, in which there are just two plates. One of the plates is over the chest and the other plate is over the abdomen. The spine runs along both the chest and abdomen body sections and plates. For simplicity, even if it is assumed that all the vertebral bodies in the spine have the same x-ray absorption, over the length of the spine in the abdomen there are solid organs, muscle and fat, and the total absorption of the beam will be high. If the image is a negative, the spine is very bright and may be the brightest pixel of the image. In contrast, over the chest, there is less solid tissue over the spine, and the absorption is consequently less. Thus, the chest image would consequently be less bright than the abdomen image. In such a scenario, the brightest pixel of the chest image may be less bright than the brightest pixel of the abdomen image.

In addition to the uncontrolled variations and the variations in the images caused by subject tissue itself, because of limited dynamic range, manufacturers of the digitizers used in the x-ray imaging devices may choose to apportion or "squeeze" the whole available intensity scale between the maximum and minimum brightness pixels. Therefore, the absorption value of a particular pixel in an overlap section of the stitched image could be assigned to different image intensity values, depending on the intensity level of the maximum and minimum pixel in each of the images that are stitched. For instance, the brightest pixel in each the chest and in the abdomen image, although one less bright than the other, would be assigned the maximum value (e.g., an image value of 32,000). This is typically done by applying a simple scaling factor. This process is called a "scale factor variation."

Once the stitched image is created, the operator may still need to set different windowing for different parts of the body, as the spine may appear saturated in the abdomen when the windowing is appropriate for the chest. Given that the radiologist starts with different images, it may be desirable to window each individual image separately.

It is to be noted that the setting of intensity values in the present application differs from parent application (Ser. No. 10/005,473). In the parent application, pixel intensity blending was concerned only with the overlap section of the stitched image. It was generally assumed that each individual image had the "correct" exposure, and that these exposures were the same for all the images being stitched. In the parent case, the blending methods used in the overlap section were intended to provide a smooth transition, with a minimum of artifacts, and to provide a pleasing perception of the overall image.

Accordingly, what are needed are methods, software, and systems that provide an accurate means for stitching images. It would be desirable to provide a highly versatile set of choices that can increase the ease of stitching. It would further be desirable to provide improved quality of the stitched image, especially in controlling the signal intensity of one or more of the images used in the stitched image.

BRIEF SUMMARY OF THE INVENTION

The present invention provides methods, software, and computer systems for stitching radiographic images to form a single, larger field of view radiographic image. More specifically, the present invention provides methods, software and computer systems that allow an operator to adjust the windowing and/or scaling of individual images so as to obtain a useful display for a reading physician. These adjustment(s) may be done for each individual image, or a portion thereof, including a stitched image, so as to provide corrections for local anatomic and hardware effects on the brightness of the image.

To combine the first and second images, the two images must be properly aligned with each other. To align the images, each of the first and second images are marked with one or more markers. The markers may be manually placed by the operator or automatically placed by the software. Because anatomic landmarks are variable, having only one type of marker available to mark and align the images may not be sufficient to accurately stitch images together. A plurality of markers, some of which are suited to different conditions better than others, provides the operator flexibility to handle the different anatomic landmarks that may be visible in the radiographic images.

For example, the markers can be a point, a plurality of points, a point and a line, or any other useful markers that allow an operator to align corresponding structures in each of the images with each other. Typically, the markers are positioned adjacent structures that are present in both of the images being stitched together.

After the markers of the first and second images are aligned, there is typically an overlap section between the first and second images. Because the images are overlapped, a portion of the first image and second image are superposed. To improve visualization—and to improve the physicians' ability to accurately diagnose the patient—the overlap section of the stitched image can be blended. Proper blending allows for an easier understanding of the anatomy and of the features that may have been introduced by motion of the patient between shots and for reduction or elimination of artifacts introduced by the imaging and digitization hardware.

Each of the digital projection images of the present invention are composed of a plurality of pixels of varying intensity (based on the absorption value of the subject tissue or element that is imaged). The pixel intensity for the pixels in the first image and the second image are calculated. The pixel intensity of the superposed pixels of the first image and second image may be compared to each other and some function of the pixel intensity of the first image and second image can be generated to create the pixels in the blended overlap section.

For example, in one embodiment, each pixel of the first image in the overlap section and each of the corresponding superposed pixels in the second section are calculated, and the larger of the two measured pixel intensities is displayed. Alternatively, the smaller of the two measured pixel intensities is displayed. In yet other embodiments, an average of the measured pixel intensities is displayed.

Another method of blending of the overlap section includes using the pixel intensity of the first image for a first portion of the overlap section and the pixel intensity of the second image for a second portion of the overlap portion. Optionally, there may be a transition portion between the first portion and the second portion of the overlap portion, in which the transition region uses an average intensity of the superposed pixels, a maximum intensity of the superposed pixels, a minimum intensity of the superposed pixels, etc.

In yet another method of blending, a smooth transition from the first image to the second image can be created. In exemplary embodiments, the transition or overlap section includes a first end, a middle point, and a second end. The first end can have 100% of the pixel intensity of the first image and 0% of the pixel intensity of the second image. The middle point can have 50% of the pixel intensity of the first image and 50% of the pixel intensity of the second image. The second end can have 0% of the pixel intensity of the first image and 100% of the pixel intensity of the second image. Between these points, the weights can vary linearly or by some other non-linear weighting relationship. Such an overlap section should provide an unnoticeable, smooth transition between the first image and the second image.

The present invention typically allows the operator to choose which type of blending method is used to blend the overlap section of the first and second image. Allowing the operator to select the method of blending provides the operator the flexibility to select the type of blending that best meets the imaging needs for that particular image dataset. The blended overlap section can be created in a variety of ways. Some methods of creating the blended overlap section include, but are not limited to maximum intensity projection (MIP), minimum intensity projection (MinIP), average, smooth transition, and the like. Depending on the desired effect on the image, in exemplary embodiments the operator will be given a choice as to which blending method is used. For example, if the operator wants to highlight high density objects, the operator can select a maximum intensity projection. If the operator wants to minimize some undesirable high intensity artifacts introduced by the imaging device, the operator can select the minimum intensity projection. For instance, notice FIG. 29, because of edge artifacts in the original images, the Maximum IP preserves these and they can be seen as thin wedges in the central portion of the stitched image. In contrast as shown in FIG. 30, the Minimum IP does not show these wedges, but notice that some rib structures (which are not important in this case) are lost along with the artifacts. It is advantageous to the operator to have both capabilities so as to allow the operator the ability to choose which better fits the clinical problem at hand. If the operator desires a smooth transition between the first and second image, the operator can select a blending method which is a weighted average, in which the weighting changing as a function of position.

Applicants have found that the intensity levels/brightness/contrast of the first and second image may be different from each other due to uncontrolled variations (e.g., intensity scale variations caused by the imaging hardware itself) and/or scale factor variations (e.g., intensity variations caused by application of a manufacturer applied scaling factor to an image). In order to correct the uncontrolled variations, scale factor variations, and to improve visualization of the final stitched image, the intensity/brightness/contrast scales of one or more of the images (or a portion thereof) may be modified before or after the images are aligned and stitched. Advantageously, this would allow the operator to adjust the intensity levels of corresponding structures in both images so that they have substantially equal intensity levels (e.g., contrast matching).

The methods and software of the present invention are flexible enough to adjust the intensity/brightness/contrast of an image that has a constant different brightness between the two images and a brightness difference that has a gradual change of brightness/contrast over the length or width of the images.

In some embodiments, it may be desirable to only change the intensity level of only a selected portion of the image. The selected portion may be in only one of the images, and/or the selected portion may be in the overlap section of the stitched image. To change the intensity level of less than all of one image, the operator may select a region of interest in the image. Selection of the region of interest may be carried out by defining two or more points, creating a window (e.g., rectangular, circular, freehand, etc.), or the like. Once the operator has selected the region of interest, the software will allow the operator to adjust the intensity level of the region of interest, using any of the methods described herein.

The software of the present invention may provide one or more methods of adjusting the intensity of the images. The multiple methods provide the operator with the flexibility to select an appropriate method for each of the individual images. In one useful method, the operator is allowed to select an image (or a portion thereof) and manually adjust the windowing scale of the image or to adjust the scaling factor of the selected image. Typically, the operator will be able to observe the image and/or the windowing scale on a computer screen. Once the desired windowing scale is achieved, the windowing scale may be stored in memory.

In another method, the operator is allowed to select an image (or a portion thereof) and scale the intensity scale of the image so as to change the pixel intensity of every pixel in the selected image (or portion thereof). Typically, the operator will be able to observe the image and/or scaling factor on the computer screen. Once the desired scaling is achieved, the scaled image (or the scaling factor) is stored in memory.

In a further method, the operator may similarly change gain and offset. Window/level scale adjustment is the mapping of the data to the computer display, and the original images remain unchanged. In contrast, changing of the gain and offset is applied to the input image and later to the output image displayed on the computer display.

If the images are stitched prior to adjusting of the intensity/brightness/contrast, it may also be possible first blend the overlap section and then calculate a scaling factor (or windowing scale) that would adjust the brightness of one or both images so that the desired structures will have a substantially equal brightness in both of the images. Alternatively, blending may be carried out after the intensity/brightness/contrast of the image(s) are adjusted.

In one particular embodiment, the present invention provides a method that comprises obtaining a first projection image and a second projection image. A signal intensity in at least one of the first projection image and the second projection image is adjusted so that the signal intensities of corresponding features in the first projection image and the second projection image are substantially equal. The first projection image and the second projection image are overlapped and the corresponding features in the first projection image and the second projection image are positionally matched (e.g., stitched).

Changing of the signal intensity may be carried out by scaling the signal intensity or by changing a window value of at least a portion of the first image and/or the second image. The adjusting of the signal intensity may be carried out either before or after the images are overlapped and matched.

In yet another embodiment, the present invention obtains a plurality of projection images. Each of the projection images will comprise one or more objects that have a known absorption value. Intensity levels of the objects in the projection images are measured and compared. An intensity of the projection images are scaled so that the objects in each of the projection images have an intensity that correlates to its known absorption value. In preferred embodiments, the objects having the known absorption value are positioned so as to not overlap any subject tissue of the projection image. Each of the objects may have substantially equal absorption values so that after scaling of the intensity of the projection images, the objects in the projection images have substantially matching intensity levels. However, in other embodiments, the objects may have different absorption values.

In a further embodiment, the present invention provides a scaled first and second projection images that have corresponding intensity scales. An inverse of the scaling factor is applied to the first and second projection images to return the first and second projection images to its original intensity scale and the first and second projection images are stitched.

In another embodiment, the present invention provides a method that stitches first and second projection images. A first windowing value or scaling value is associated in the stitched image with a first point in any region of the stitched image and a second windowing value or scaling value is associated in the stitched image with a second point in any region of the stitched image. The windowing value or scaling value is varied along a line joining the first and second points in such a manner that the windowing value or windowing value at each point is unchanged, and between points the first and second points the windowing value or scaling value varies following a smooth function.

In some configurations the application of the smooth function is restricted to a region between the first and second points. In other configurations, the smooth function is continued into the region of the image beyond the region delimited by the first and second points.

These and other aspects of the invention will further evident from the attached drawings and description of the present invention.

BRIEF DESCRIPTION OF THE DRAWINGS

FIG. 6A shows a first image having a first marker and a second image having a second marker;

FIG. 6B shows a composite image in which the first marker of the first image is matched up with the second marker of the second image;

FIG. 7A illustrates a first image having a first and second point marker and a second image having a third and fourth point marker;

FIG. 7B illustrates a composite image in which the first and third points and second and fourth points have been matched up, respectively;

FIG. 8A illustrates a first image having a first point marker and a first line and a second image having a second point marker and a second line;

FIG. 8B illustrates a composite image in which the first and second point are superposed over each other and the first and second images are rotated until the first and second line are in a parallel configuration;

FIG. 9A illustrates a first image having a first line and a second image having a second line;

FIG. 9B illustrates a composite image in which a first end of the first line is aligned with a first end of the second line, and one of the images of FIG. 7A is rotated until the lines are parallel;

FIG. 13 illustrates another method of the present invention which corrects for uncontrolled variations of image intensity.

FIG. 20B illustrates another specific method of brightness/contrast matching of two images that have a gradual change of brightness/contrast.

DETAILED DESCRIPTION OF THE INVENTION

The present invention provides improved methods, systems, software and graphical user interfaces for allowing an operator to stitch and/or blend a plurality of DICOM digital radiographic images together.

Figure 1A:
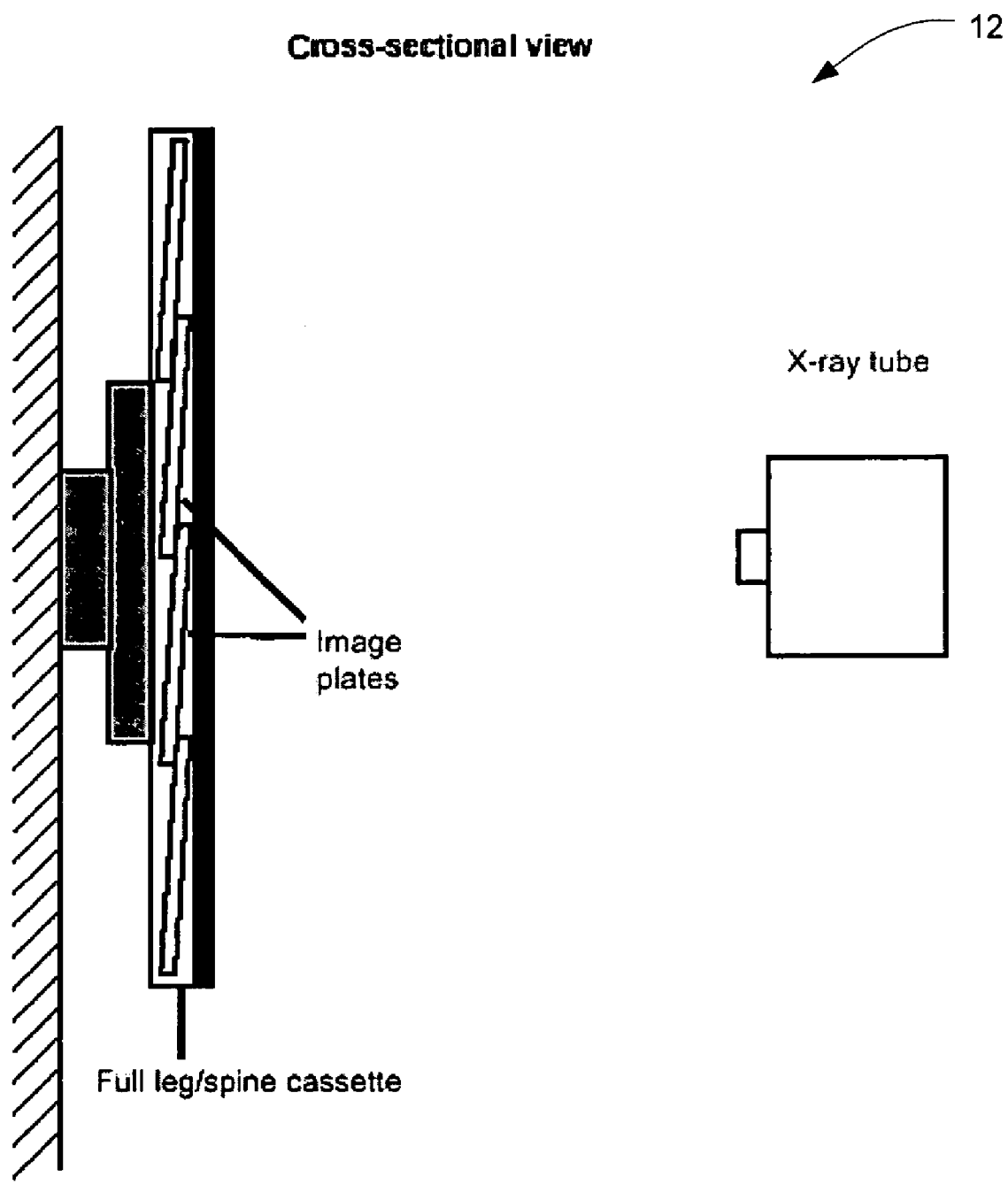
FIG. 1A illustrates one imaging device that comprises an x-ray source and a plurality of overlapping images plates that are used to obtain a plurality of projection images that are stitched together to form a full image of the subject tissue.
Figure 1:
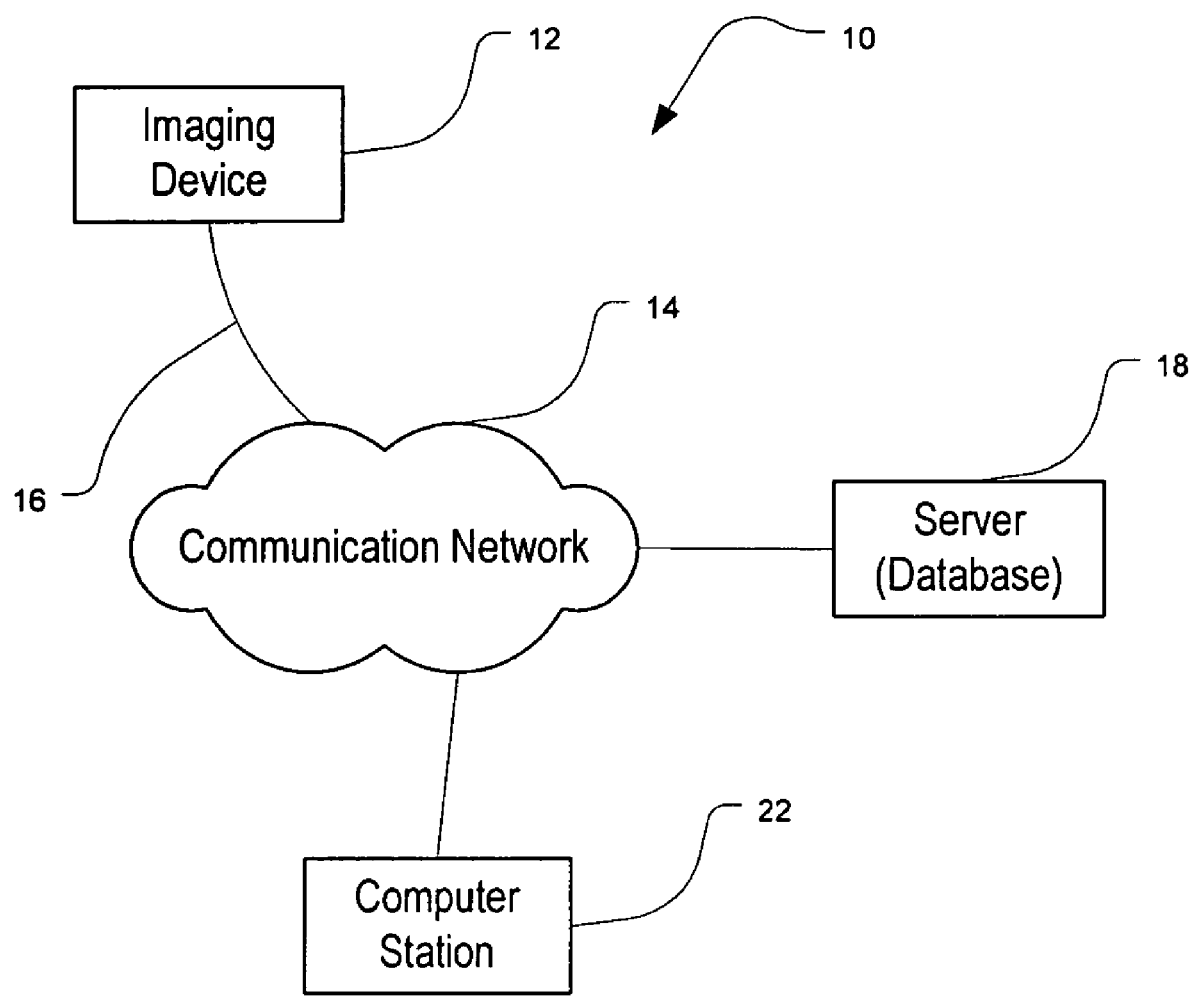
FIG. 1 is a simplified block diagram of a system incorporating the present invention.

FIG. 1 is a simplified block diagram of a system 10 which may incorporate the present invention. As shown, system 10 comprises an imaging device 12, such as an x-ray, MRI, CT, ultrasound, nuclear imaging device, or the like that is coupled to a communication network 14 (such as an intranet, LAN, WAN, or the internet) via communication link(s) 16. System 10 depicted in FIG. 1 includes a computer system 22 that communicates with the imaging device that can run software for manipulating images obtained from imaging device 16. It should be appreciated however, that system 10 depicted in FIG. 1 is merely illustrative of an embodiment incorporating the present invention and does not limit the scope of the present invention. For example, instead of delivering the image data to computer system 22 via a communication network, the images can be delivered to the computer software via a computer readable medium, such as a floppy disk, CD-ROM, or the like. Alternatively, images obtained from the imaging device can be stored on a separate server or database 18 that is coupled to computer system 22 via communication network 14.

Communication network 14 provides a mechanism allowing the various components of computer network 14 to communicate and exchange information with each other. Communication network itself may be comprised of many interconnected computer systems and communication links. Communication links 16 may be hardwired links, optical links, wireless links, or other conventional communication links.

Figure 2:
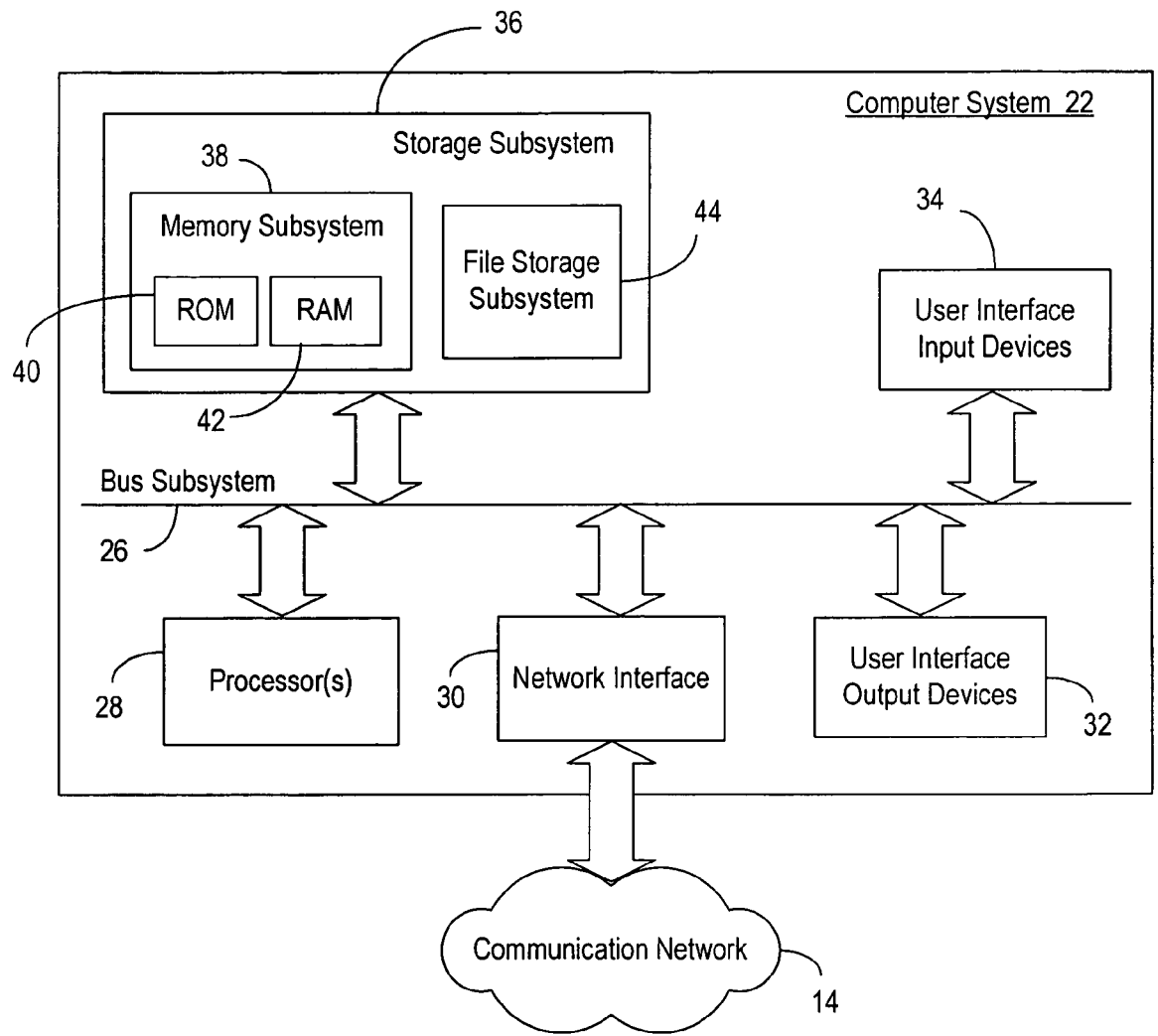
FIG. 2 is a simplified block diagram of an exemplary computer system that can run the software of the present invention.

FIG. 2 is a simplified block diagram of an exemplary computer system 22 that can run the software of the present invention. Computer system 22 typically includes at least one processor 28 which communicates with a number of peripheral devices via a bus subsystem 26. These peripheral devices may include a storage subsystem 36, comprising a memory subsystem 38 and a file storage subsystem 44, user interface input devices 34, user interface output devices 32, and a network interface subsystem 30. Network interface subsystem 30 provides an interface to outside networks, including an interface to communication network 20, and is coupled via communication network 46 to corresponding interface devices in other computer systems.

User interface input devices 34 may include a keyboard, pointing devices such as a mouse, trackball, touch pad, or graphics tablet, a scanner, foot pedals, a joystick, a touchscreen incorporated into the output device 32, audio input devices such as voice recognition systems, microphones, and other types of input devices. In general, use of the term "input device" is intended to include a variety of conventional and proprietary devices and ways to input information into computer system 24 or onto computer network 46.

User interface output devices 32 may include a display subsystem, a printer, a fax machine, or non-visual displays such as audio output devices. The display subsystem may be a cathode ray tube (CRT), a flat-panel device such as a liquid crystal display (LCD), a projection device, or the like. The display subsystem may also provide non-visual display such as via audio output devices. In general, use of the term "output device" is intended to include a variety of devices and ways to output information from computer system 24 to an operator or to another machine or computer system.

Storage subsystem 36 stores the basic programming and data constructs that provide the functionality of the various embodiments of the present invention. For example, database and modules implementing the functionality of the present invention may be stored in storage subsystem 36. These software modules are generally executed by processor 28. In a distributed environment, the software modules may be stored on a plurality of computer systems and executed by processors of the plurality of computer systems. Storage subsystem 36 typically comprises memory subsystem 38 and file storage subsystem 44.

Memory subsystem 38 typically includes a number of memories including a main random access memory (RAM) 42 for storage of instructions and data during program execution and a read only memory (ROM) 40 in which fixed instructions are stored. File storage subsystem 44 provides persistent (non-volatile) storage for program and data files, and may include a hard disk drive, a floppy disk drive along with associated removable media, a Compact Digital Read Only Memory (CD-ROM) drive, an optical drive, or removable media cartridges. One or more of the drives may be located at remote locations on other connected computers at other sites coupled to communication network 20. The databases and modules implementing the functionality of the present invention may also be stored by file storage subsystem 44.

Bus subsystem 26 provides a mechanism for letting the various components and subsystems of computer system 22 communicate with each other as intended. The various subsystems and components of computer system 22 need not be at the same physical location but may be distributed at various locations within distributed network 10. Although bus subsystem 26 is shown schematically as a single bus, alternate embodiments of the bus subsystem may utilize multiple busses.

Computer system 22 itself can be of varying types including a personal computer, a portable computer, a workstation, a computer terminal, a network computer, a module in the imaging unit, a mainframe, or any other data processing system. Due to the ever-changing nature of computers and networks, the description of computer system 24 depicted in FIG. 2 is intended only as a specific example for purposes of illustrating the preferred embodiment of the present invention. Many other configurations of computer system 24 are possible having more or less components than the computer system depicted in FIG. 2.

Figure 3A:
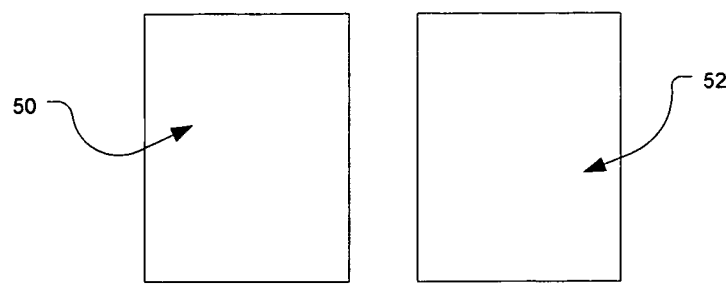
FIGS. 3A to 3D illustrate a simplified method of the present invention.
Figure 3B:
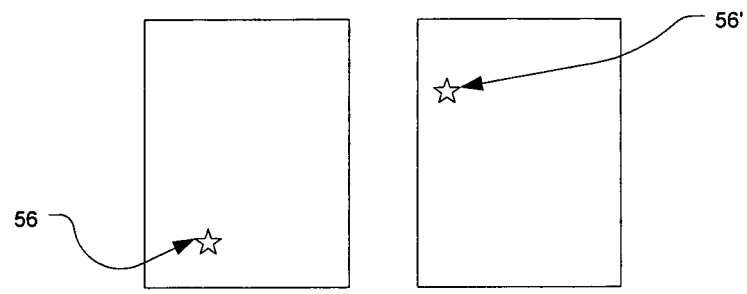

FIGS. 3A to 3D illustrate a simplified stitching method that can be performed on the systems 10 of the present invention. As shown in FIGS. 3A and 3B, at least a first image 50 and second image 52 can be stitched together to form a single, composite image 54 (FIG. 3D) that provides a larger field of view for visualization and analysis by an examining physician. In order to accurately perform an analysis on target areas of the body that cannot be properly viewed on a single radiographic image, the physician must stitch the two images 50, 52 together. As shown in FIGS. 3A and 3B, the target images can be marked with one or more markers 56, 56' at substantially the same anatomic landmark in the patient's body. Typically, the operator will place marker 56 over a rigid landmark, such as any metal screws, stents, brace, vertebral bodies, joints, or the like.

Oftentimes, because the subject or imaging device will have moved or rotated during imaging, the first and second images may be taken from different angles and it may be difficult to accurately match the two images. Thus, as will be described in detail below, certain marking techniques may be more beneficial than other methods of marking in stitching the two or more images together.

Figure 3C:
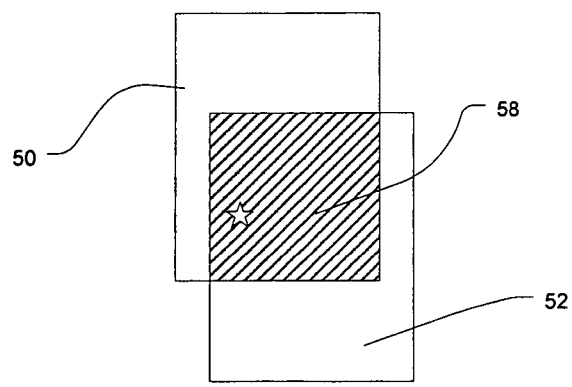
Figure 3D:
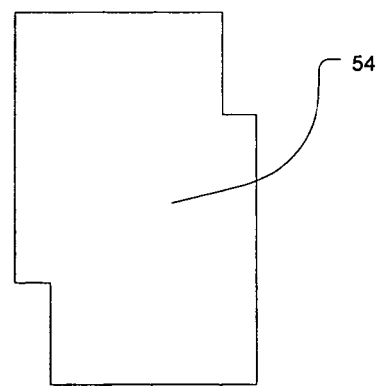

As shown in FIG. 3C, after the images are marked, markers 56, 56' on the first image 50 and second image 52 can be matched together manually or automatically with the software. In some embodiments, the images can be translated and superposed without any rotation. In other embodiments, however, the images can be translated and rotated so that the markers can be accurately aligned. As shown in FIG. 3C, when the markers on the first and second images are aligned with each other, a portion of the first image and a portion of the second image will also be superposed over each other. Such sections are hereinafter referred to as an "overlap section" 58. In exemplary embodiments, the present invention provides methods of blending the overlap section 58 so as to provide improved visualization of the composite stitched image. Once the overlap section 58 is blended the final stitched image 54 can be analyzed by the examining physician.

Figure 4:
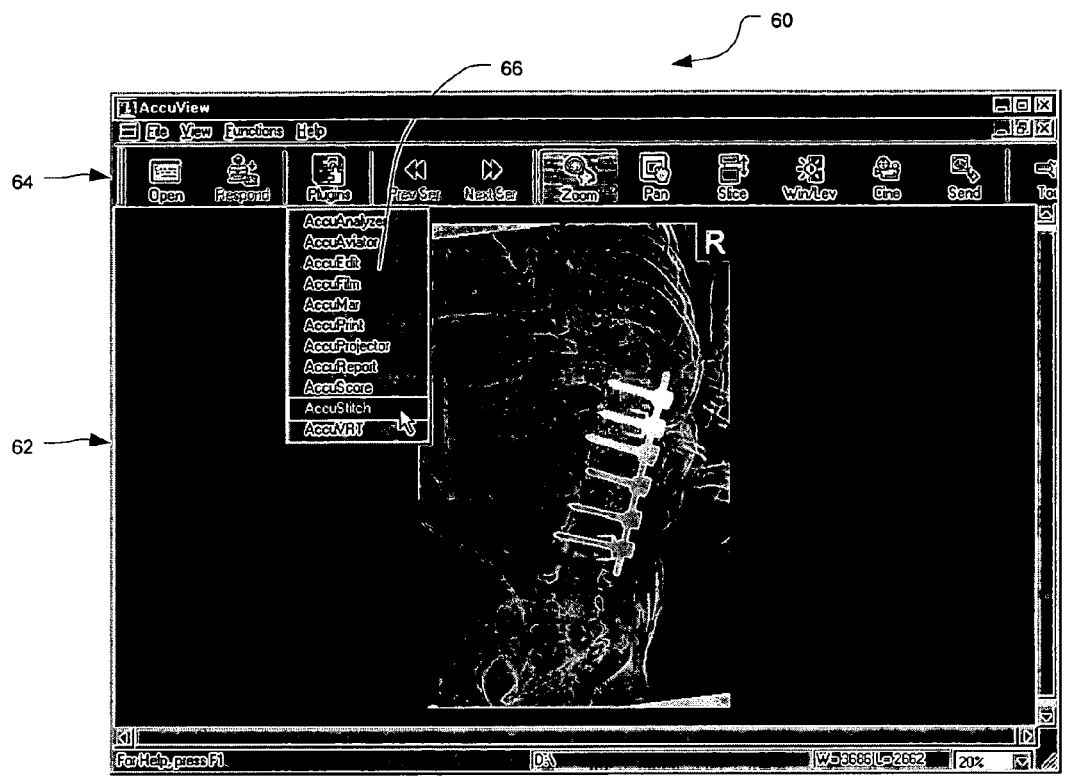
FIG. 4 is a graphical user interface of the present invention displaying a single image and a tool palette.

Referring now to FIG. 4, the present invention further provides a graphical user interface 60 that can be displayed on output device 32 of the computer system 22 of the present invention (FIG. 2). The graphical user interface 60 of the present invention has an image window 62 and a tool palette 64 for allowing operator input to manipulate the images. As illustrated by the pull-down menu 66, the stitching functionality (shown herein as "AccuStitch") provided by the present invention can be a software module of an imaging software program, or alternatively the stitching functionality can be a stand alone software program. Another exemplary graphical user interface that can incorporate the present invention is described in U.S. patent application Ser. No. 09/908,466, filed Jul. 17, 2001, the complete disclosure of which is incorporated herein by reference.

Figure 5:
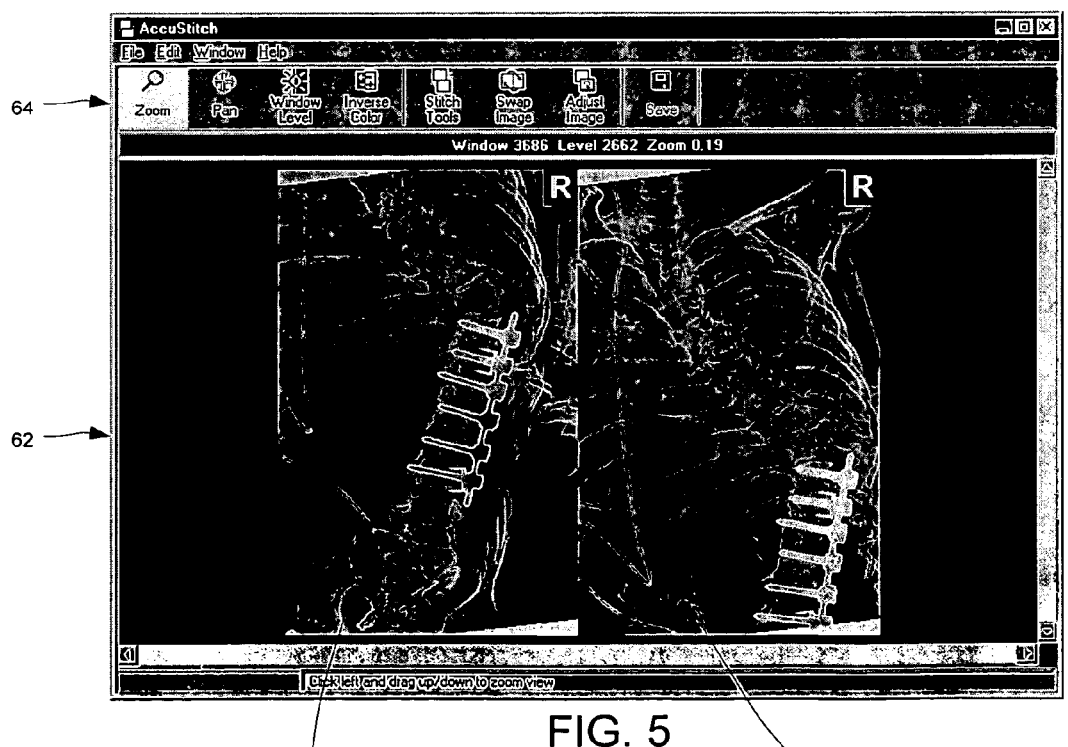
FIG. 5 illustrates a graphical user interface showing a first image and a second image that are to be stitched.

When the operator desires to stitch a plurality of images together, the operator can download the desired images into the software, either via communication network 14 or from memory 36, and display the images in the image window 62 of graphical user interface 60. As shown in FIG. 5, first image 68 and second image 70 are typically displayed adjacent to one another in image window 62. Typically, first image 68 and second image 70 are taken from the same imaging unit and have the same dimensionality and gray scale. If desired, the operator can manipulate the zoom factor of the images, translate the images, switch the images, rotate the images, or the like, using tool palette 64. After images 68, 70 are displayed in image window 62, the operator can place at least one marker/fiducial on each of the images over the same anatomic landmark(s), blend the overlap section of the image, and the like, to generate the final composite image.

In exemplary embodiments, the present invention can allow the operator to choose what type of marker or fiducial can be placed on the images to mark and align the images. Applicants have found that providing a plurality of marking methods gives the operator the ability to accurately align the images, no matter what type of anatomic conditions are present in the image dataset. Such flexibility of marking the images improves the visualization of the target body area, and consequently provides the examining physician an opportunity to accurately examine the images.

In some situations, it may be desirable to use a single point to align the images. Such a marking method is desirable when it is known that rotation has not occurred, and such a method may prevent operator-introduced rotation of the images.

In other instances, however, it may be required to use a plurality of markers (e.g., two points, a point and a line, etc.) on each image to correct any rotation or movement of the patient during the imaging. In one embodiment, the present invention marks two points on each image. The present invention moves the images so as to match the points and rotates one image with respect to the other so that the other two points in each image are substantially matched. Such a method is commonly used for its simplicity. In another embodiment, the present invention marks one point and a line on each image. The operator or software matches the points and rotates the image about that point so the lines will be parallel. Such a method is useful when one point in the image is easily identified, and a long feature (such as a steel brace or leg bone) is present providing a long region that is easily identified. In another embodiment, the present invention marks a line on each image. The present invention will match the last point of the first line to the first point of the second line and rotate the images to make the lines parallel. This method is useful when a feature such as a brace or a particular bone is seen partially in one image and partially on the other, with just a minimum of overlap.

The aforementioned marking methods are discussed in more detail below in relation to FIGS. 6A-9B. As shown in FIG. 6A, if it is known that the patient has been held rigid and the imaging device is held rigid such that there is no rotation of the target tissue when the images are obtained, a single point will be the easiest and fastest method of aligning the first and second images. As shown in FIG. 6A, a first marker 72 can be placed over/adjacent a landmark 74 in first image 50, and a second marker 76 can be placed over/adjacent landmark 74' in second image 52. After the images 50, 52 have been marked, the markers can be superposed over each other so as to align images 50, 52 (FIG. 6B). When only one marker is used to mark the images, typically the first and second images will not be rotated so as to prevent the introduction of mis-registration of the images. It should be appreciated however, that in alternative embodiments, it may be possible to rotate at least one of the images to properly align the first image 50 with the second image.

Due to patient breathing and/or shifting during the imaging, oftentimes there will be some misalignment between the first image and the subsequent images taken. Thus, a single point marker may not be sufficient to accurately align and stitch the images together. FIG. 7A shows a first image 50' and a second image 52' in which the operator places a first and second marker 76, 78 on the first image 50' and a third and fourth marker 80, 82 on the second image 52'. To stitch the first and second image, the operator can manually align or the computer software can be programmed to automatically align the first marker 76 with the third marker 80 and the second marker 78 with the fourth marker 82 (FIG. 7B). Similar to the method of FIG. 6A, the markers are typically positioned an adjacent anatomic landmark that is visible in both the first image 50' and second image 52'.

In placing two markers on each image the operator may inadvertently introduce a small placement error, so that the distance between the markers in the first image is not equal to the distance between the markers in the second image. In that case, the software may split the difference, and further allows for small manual adjustments for further refining the position of the markers.

To account for rotation differences between the two images, a point marker and a line marker may be used. FIG. 8A shows a first marker 84 and a first line L1 placed on a first image 50" and a second marker 86 and a second line L2 placed on a second image 52". In such a marking method, the operator will place first marker 84 and second marker 86 substantially over the same anatomic landmark in the first and second image. First line L1 and second line L2 can be positioned any desired place in the first and second image. To align and stitch the first and second images, as shown in FIG. 8B, the operator or computer software can superpose the first marker 84 over the second marker 86, or vice-versa. Thereafter, at least one of the images 50", 52" can be rotated until lines L1 and L2 are parallel. The image will typically be rotated about points 84, 86 until the lines L1, L2 are parallel.

FIG. 9A illustrates a method of aligning a first image 50''' with a second image 52''' through use of lines. A first line 88 having a first point 90 and a second point 92 is drawn on the first image. A corresponding second line 94 having a third point 96 and a fourth point 98 can be drawn in a contiguous anatomic position in the second image. The software of the present invention aligns point one 90 and point three 96 (or points two and four if desired) and rotates the first line 88 or second line 94 about the first point/second point so that the lines are substantially superposed over each other. The stitched image is shown in FIG. 9B.

Figure 10A:
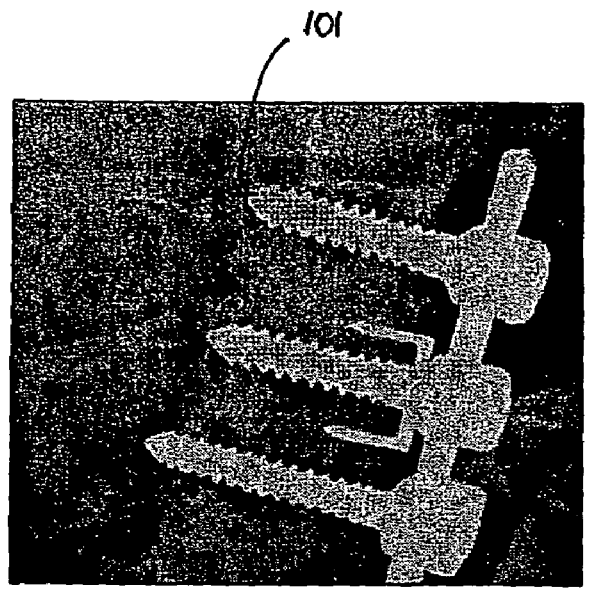
FIGS. 10A and 10B illustrate a method of marking the images using a cursor and mouse.
Figure 10B:
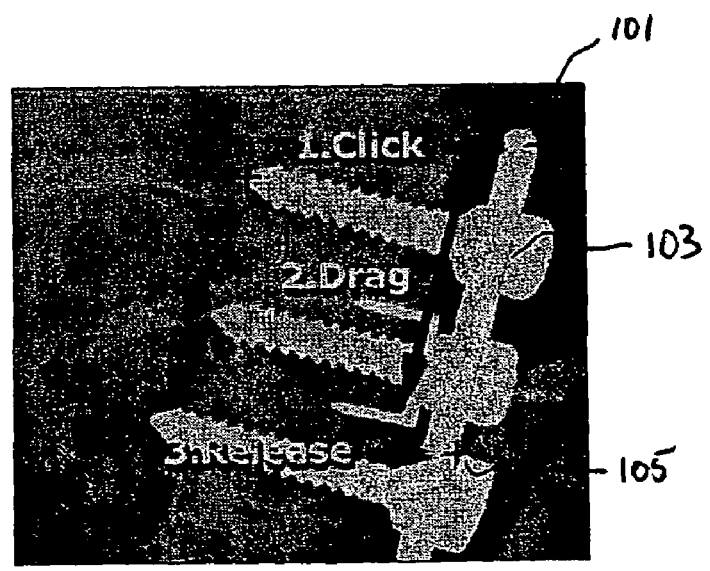

The point markers and/or lines can be placed on the images using a variety of conventional and proprietary methods. For example, in one exemplary method, an operator can click on a button of a mouse while placing a cursor 101 over a target portion of the image (FIG. 10A). To draw a line 103, the operator need only left click on a mouse button at a point of the image to start the line and drag the cursor 101 to an ending point 105 of the line and release the mouse button (FIG. 10B). It should be appreciated however, that other input devices, such as the keyboard, joystick, or the like can be used to draw the points and lines.

As can be appreciated, after the images are marked and aligned, the software of the present invention may be configured to allow the operator to manually translate and/or rotate one or both of the images to correct any inaccuracies in the alignment.

The operator may find that the signal intensity scale or brightness/contrast of the two images to be stitched are different, such that the structure of interest in the image(s) has a different intensity. The difference in brightness/contrast may be constant throughout each image (e.g., each image has a different, constant brightness/contrast) or the images may have a different, variable brightness/contrast. In either instance, Applicants have found it desirable to provide one or more methods for adjusting of the intensity of at least a portion of at least one of the images. The adjustment of the intensity may be performed before or after the images are stitched. Methods for adjusting the intensity may use controls such as window and level, lower and upper level, scaling, and gain and offset, or the like, all of which are known to persons of skill in the art.

Allowing the operator to adjust the intensity of each of the images independently has proven to be useful for correcting for uncontrolled variations (e.g., intensity scale variations caused by the imaging hardware itself) and/or for correcting scale factor variations in the images (e.g., intensity variations caused by application of a manufacturer applied scaling factor to an image).

Figures 11A, 11B:
FIGS. 11A and 11B illustrate two images that are to be stitched together.
Figures 11C, 11D:
FIG. 11C illustrates a stitched image in which the contrast/brightness is not adjusted.
FIG. 11D illustrates a stitched image in which the contrast/brightness of at least a portion of one of the images is adjusted before or after stitching.

FIGS. 11A and 11B illustrate two images that are to be stitched together. As can be seen, the bones in each image have different intensity scales, and if stitched together without adjusting the intensity scale of the images, the resultant stitched image will have a different intensity level for the same bone. FIG. 11C shows a "normal" stitched image of the images of FIG. 11A and 11B, in which no adjustment to the intensity scale is performed. FIG. 11D illustrates a stitched image in which the intensity is adjusted in at least a portion of at least one of the images using the methods and software of the present invention.

Figure 12:
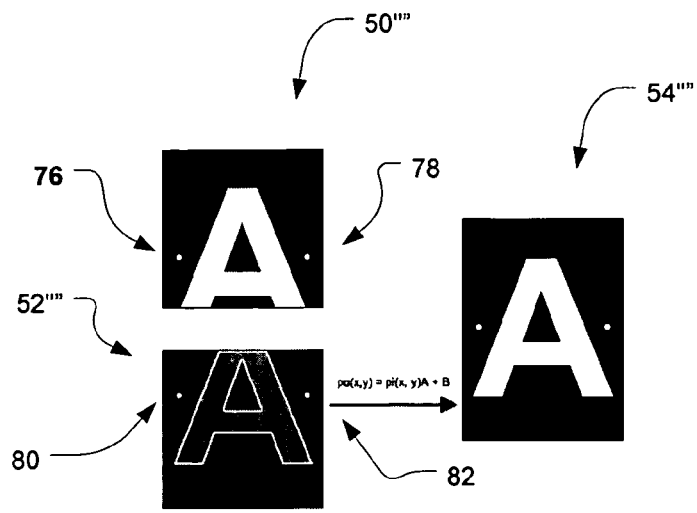
FIG. 12 illustrates brightness/contrast matching of two images that have a constant different brightness/contrast.
Figure 12A:
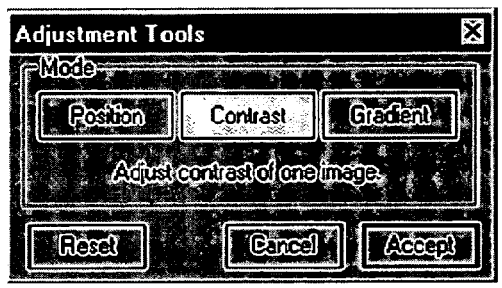
FIGS. 12A and 12B illustrate graphical user interfaces in the form of windows that allow a user to adjust the contrast one image (contrast) and to smoothly adjust contrast of both images (gradient)
Figure 12B:
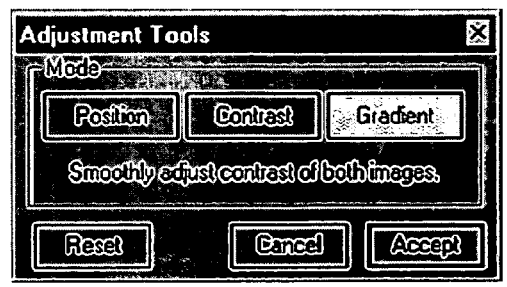

FIG. 12 is an example in which the gain and offset of one image is adjusted to substantially match the gain and offset of the other image. A first image 50″″ is marked with markers 76, 78 and a second image 52″″ is marked with points 80, 82. Before or after the points 76, 80, 78, 82 are aligned with each other, the intensity of the lower image (e.g., second image 52″″) is adjusted to substantially match the intensity of the higher image (e.g., first image 50″″). In alternative embodiments, the intensity of the "higher" image may be adjusted to substantially match the lower image (not shown). The right portion of FIG. 12 shows the composite image 54″″ of the stitched images, in which the gain and offset of the lower image has been adjusted. FIGS. 12A and 12B illustrate graphical user interfaces in the form of windows that allow a user to adjust the contrast one image (contrast) and to smoothly adjust contrast of both images (gradient).

In one embodiment, to adjust the intensity of the lower image, the following formula may be used:

$$P_0(x,y) = p_i(x,y)A + B$$

in which $p_o(x,y)$ is the is the output intensity at x,y, and $p_i(x,y)$ is the input (original) intensity at x,y, and A and B are operator-defined gain and offset for the lower image.

In one embodiment, the user adjusts the operator defined gain and offset (A and B), by dragging a mouse while observing the image. This is performed exactly the same way the user would normally adjust Window/Level, but with this method the Window/Level (shared by both images) are not changed. On the other hand, A and B are computed and applied to the images before being passed to the W/L calculation. It is noted that for the special case of B=0, the operation is scaling, which is typically (but not necessarily) done with a value of A that is non zero, but can be less than 1.

It can also be noted that for the minimum value of $p_i(x,y)$ and B<0, the quantity [Min $p_i(x,y)$]A+B becomes the lower level when upper and lower levels are used, and L−W/2 when windowing is used. The value of $p_i(x,y)$ which saturates the display becomes the upper level or L+W/2. From these, L and W are calculated. If desired, non-linear functions of $p_i(x,y)$ can be used as well or lookup tables.

The operator may actuate the software to apply the gain (e.g., scale factor) and offset to adjust the intensity of one or more of the images so that desired portions of both images have substantially equal intensity levels. As the scaling factor is being applied, the operator may visually observe the change of the intensities in the image(s) or monitor a numerical scale of the intensity. Once the desired intensity is achieved, the scaled image may be stored in memory and thereafter used for stitching.

In alternative methods, instead of scaling the intensity, the operator may adjust the windowing of one or more of the images. The windowing may be performed manually by the operator or automatically by the software of the present invention. If the adjustment is done manually, the operator may observe the windowing of the images on the graphical user interface of the computer system. Once the desired windowing is achieved, the windowing scales may be stored in memory and used in the stitching process.

As noted above, instead of scaling or windowing one or more of the images before stitching, the individual images may first be stitched and windowed or scaled after the images are stitched together. In such embodiments, the operator may select a region of interest in the overlap section of the stitched image. The software will be configured to measure a sum or average signal intensity in both images and calculate a scaling factor (or windowing factor) so that the intensity scales of both images are substantially equal to each other. Thereafter, the scaling factor or windowing scales will be applied to all pixels of one of the image (or selected portion of the image (s)), as appropriate, to adjust the contrast/brightness of the images that are stitched. If desired, it may be possible to window or scale both of the images 50″″, 52″″ to different window scales or intensity scales.

In addition to the methods shown in FIG. 12, FIG. 13 illustrates another method of the present invention which corrects for uncontrolled variations of image intensity. In such an embodiment, object(s) of known absorption values (typically equal absorption values) are placed adjacent the subject tissue so that at least one object will appear in each of the images that are to be stitched. Preferably, the objects will not interact with the subject tissue (e.g., will not overlap with the subject tissue in the projection that is obtained). Once the images are obtained, the operator may manually set a region of interest over each of the objects in each of the images to measure the average intensity in the region of interest. Since the region of interest (e.g., the object) in each of the images should have the same intensity level, the difference between the measured intensity level may be used to generate a scaling factor so that the objects in each of the images will have substantially the same intensity level. Thereafter, the scaling factor may be used to change the intensity level of the all of the pixels in the image so that the objects in each of the images used for stitching will have the same intensity level. In other embodiments, however, it may be desirable to place objects of known absorption values that have differing absorption values.

Figure 11E:
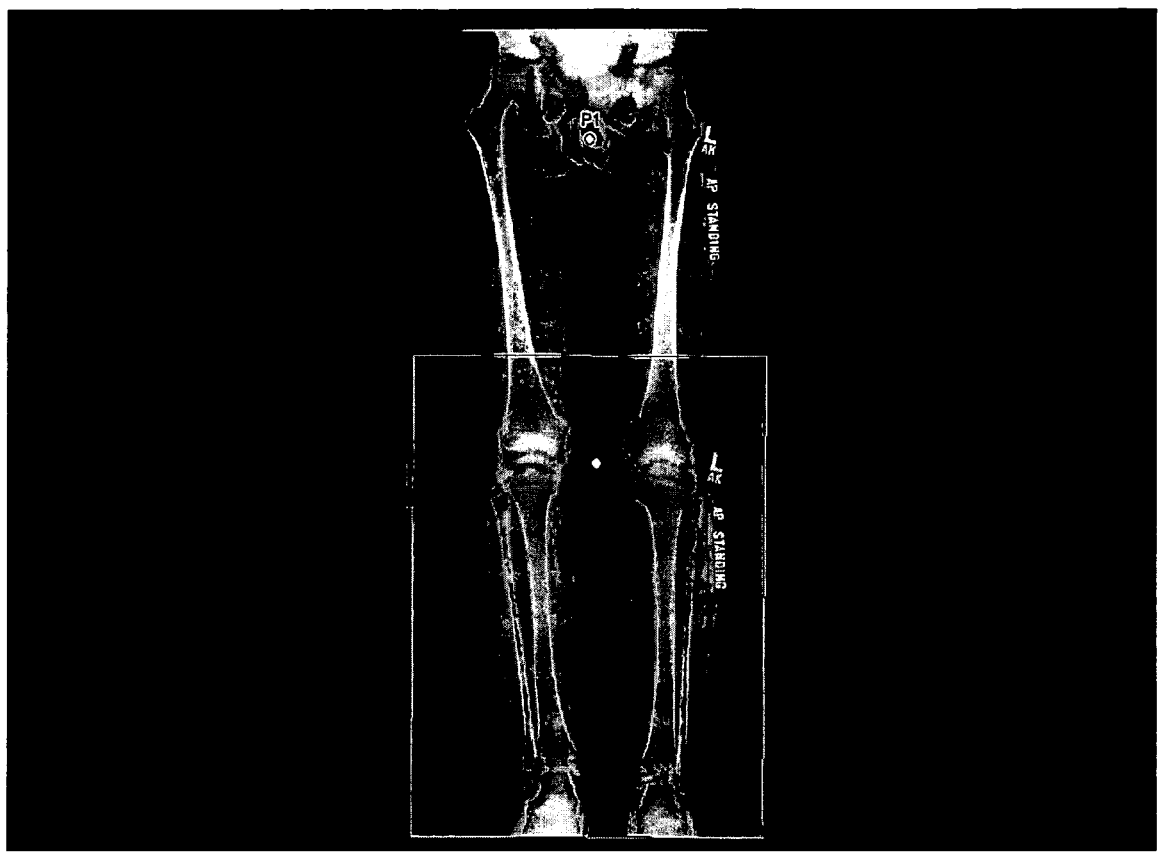
FIG. 11E illustrates a stitched image in which first and second points P1 and P2 are chosen and the brightness/contrast of the area between the points P1, P2 are adjusted.
Figure 14:
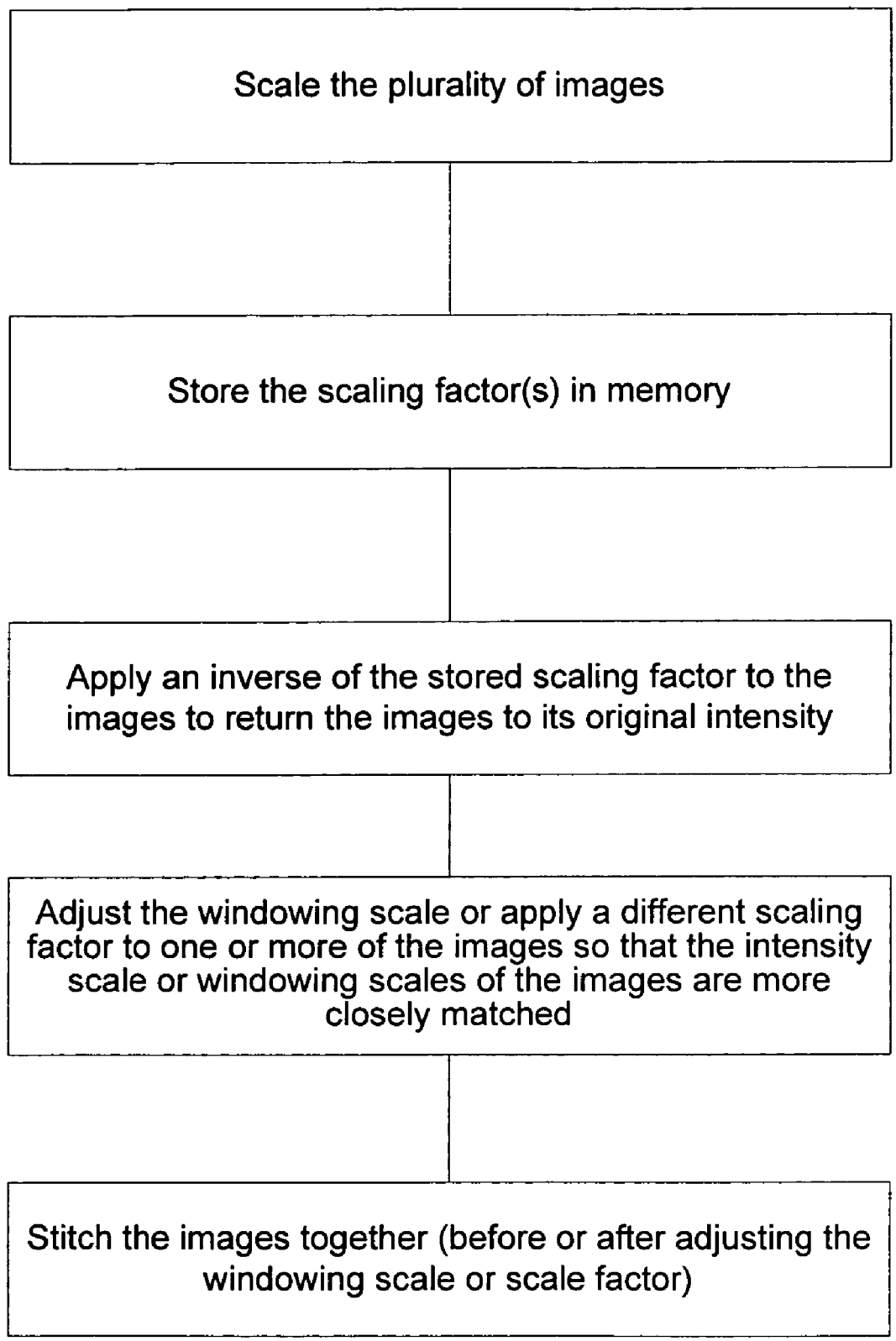
FIG. 14 illustrates a method encompassed by the present invention that may be used to correct for scale factor variations in which the scaling and storing of the scale factor is done by the imaging system.

In addition to the embodiment of FIG. 11, FIG. 14 illustrates another exemplary method of the present invention that may be used to correct for scale factor variations. As noted above, because of the limited dynamic range of the x-ray imaging devices, manufacturers may choose to apportion the whole available intensity scale between the brightest and zero brightness pixel of each of the image. Thus, even if two different images have different maximum brightness, the scaling factor applied by the manufacturer will have the brightest pixel in each image have the same intensity level. As can be imagined, such a scaling factor may not accurately portray the actual intensity levels of the images. For example, if the brightest portion of a chest image is the spine, and the brightest portion of an abdomen image is not the spine, but some other element, the spine in each of the images would be scaled up to a different brightness.

To correct for such scale factor variations, if the scaling factor is stored with the adjusted image(s) or otherwise available to the operator or software, an inverse of the scale factor can be applied to each of the images to return each of the images to its original intensity scale. Or, equivalently, the ratio of the two scale factors may be applied to just one image that is used for stitching. After the images are returned to their original intensity scales, the operator or software may adjust the windowing scale or apply a different scaling factor to both images so that the intensity are still matched. The images may be stitched before or after the images are returned to their original intensity scales.

In another aspect, the present invention provides further methods of blending the overlap section of the first image and the second image. The blending methods of the present invention may be used with any of the alignment methods and/or intensity adjustment methods described above and is typically performed after the intensity scales are adjusted for one or more of the images. Generally, the pixel intensities of the first image and second image are calculated and alignment of the first image with the second image is validated by displaying an absolute difference between the pixel intensities of the first image and the second image in the overlap section. In such methods, the operator can visually determine, in real-time, if the first and second images are correctly aligned.

Figure 15:
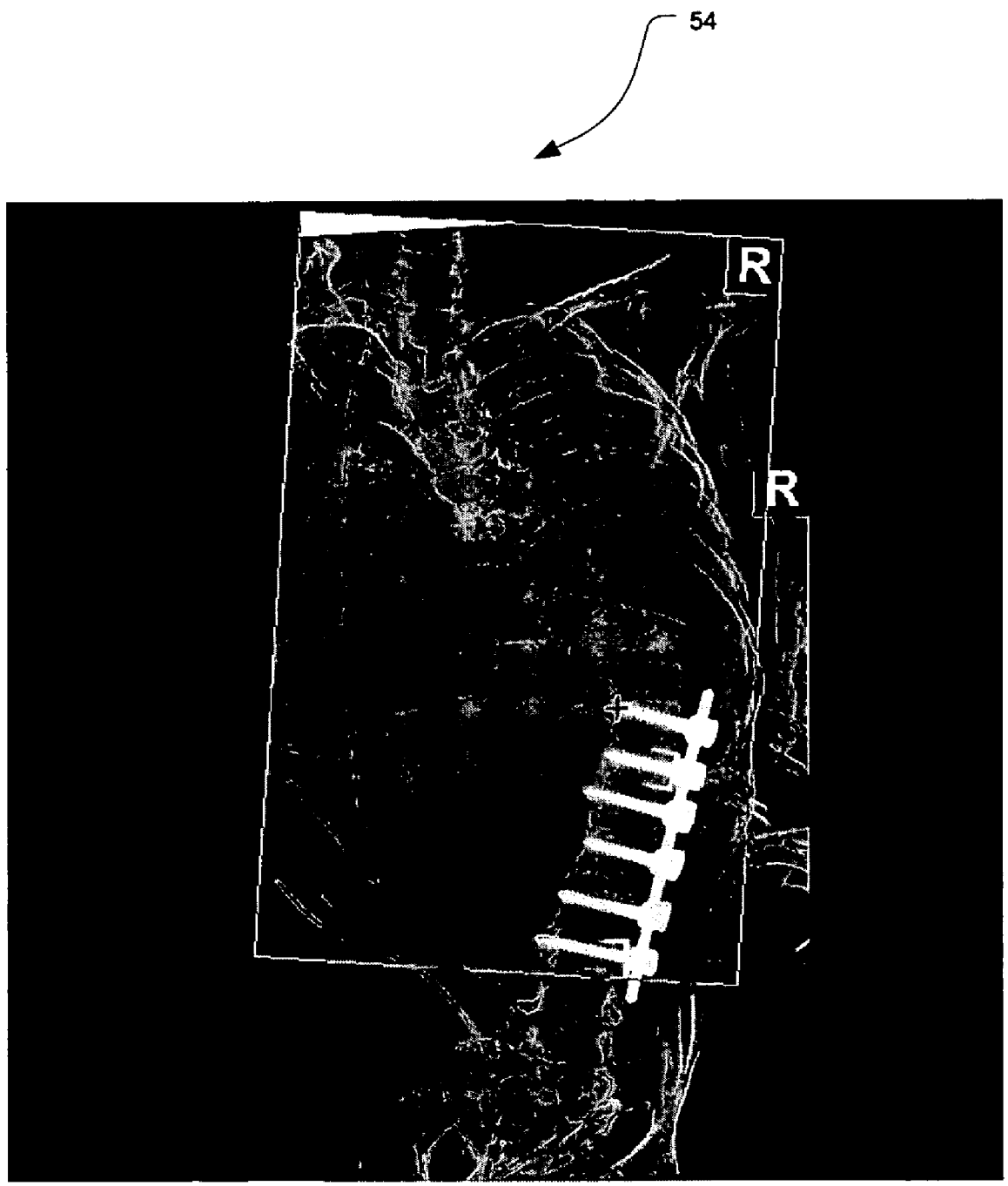
FIG. 15 illustrates a stitched image of the present invention.

After the first image 50 and second image 52 have be superposed and aligned with each other, in some exemplary methods and software of the present invention, the operator can blend the overlap section 18 of the images together to improve visualization of the overlap section 18 (FIG. 15). The software of the present invention will typically support a plurality of methods to blend the overlap section of the images. Each of the methods of blending can be used to provide different visual outputs, depending on the desired characteristics of the overlap section. The blended overlap section can be created in a variety of ways. Some methods of creating the blended overlap section include, but are not limited to maximum intensity projection (MIP) (FIG. 29), minimum intensity projection (MinIp) (FIG. 30), average, smooth transition, and the like. Depending on the desired effect on the image, in exemplary embodiments the operator will be given a choice as to which blending method is used. For example, if the operator wants to highlight high-density objects, the operator can select a maximum intensity projection. If the operator wants to minimize some undesirable high intensity artifacts introduced by the imaging device, the operator can select the minimum intensity projection. If the operator desires a smooth transition between the first and second image, the operator can select a blending method which is a weighted average, the weighting changing as a function of position.

Advantageously, the methods of the present invention provide direct visual feedback in real time regarding the registration between the images in the overlap section. The absolute difference will show how well the pixels of the overlapped images correlate. If there is an exact match, the entire overlap section will be black and the operator will know that there was a registration. More likely however, there will be some differences in the images, due to patient movement or the like. If the images are not correctly aligned, the operator can rotate or translate at least one of the images observing and minimizing the differences in the overlap section until the images are accurately aligned in the area of interest, or over the anatomic feature of interest, even if this is not possible over the whole region of overlap.

Figure 16:
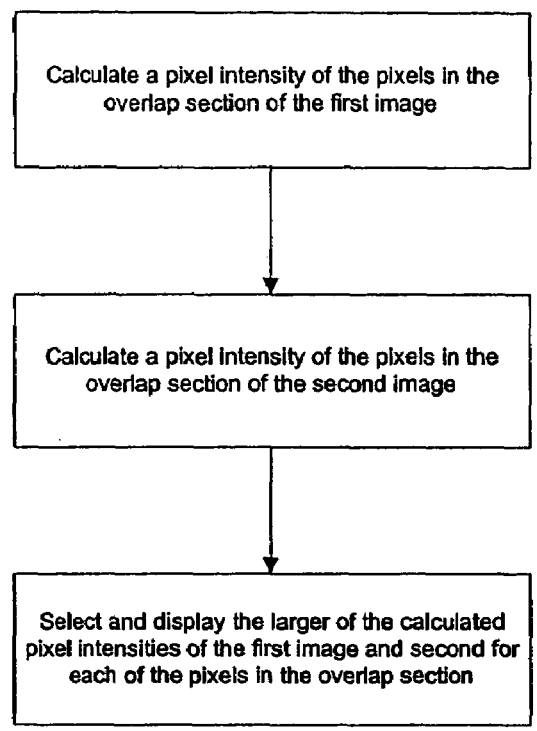
FIG. 16 is a flow chart illustrating a simplified method of blending an overlap section of superposed first and second images using a maximum intensity pixel.
Figure 29:
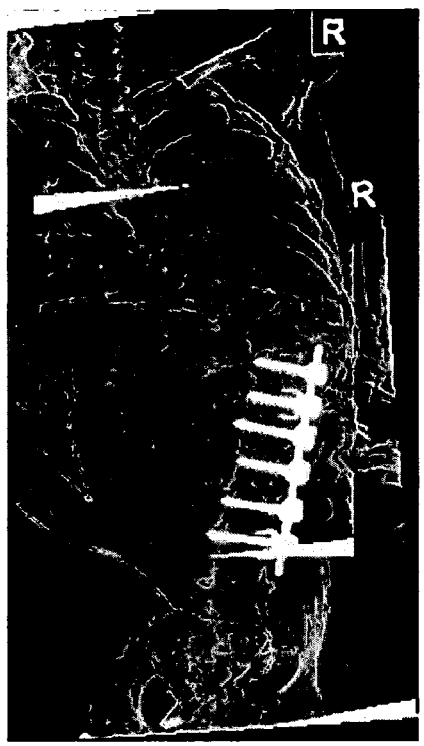
FIG. 29 illustrates a Maximum Intensity Projection Image.

FIG. 16 shows a simplified flow chart of one exemplary blending method that displays a maximum intensity pixel in the overlap section. In such methods, a pixel intensity of all of the pixels in overlap section of the first and second images is calculated on a pixel-by-pixel basis (Steps 100, 102). The pixel that is actually displayed in the overlap section will be the larger of the measured pixel intensity of the overlapping corresponding pixels in the first image and the second image (Step 104). Such a method provides a maximum sharpness and reduces any blurring due to movement of the patient during imaging and highlights high-density objects (FIG. 29). Furthermore, such a method also eliminates artifacts from dark bands that may appear because of the absorption of the film holders.

Figure 17:
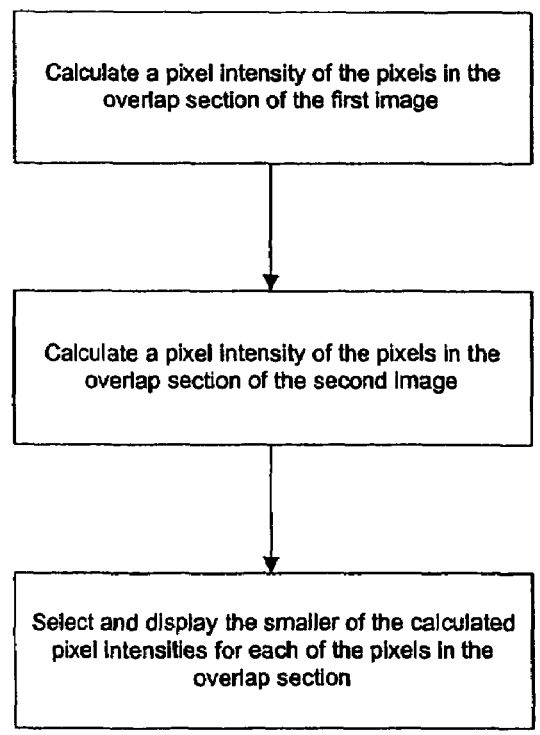
FIG. 17 is a flow chart illustrating another simplified method of blending an overlap section of superposed first and second images using a minimum intensity pixel.
Figure 30:
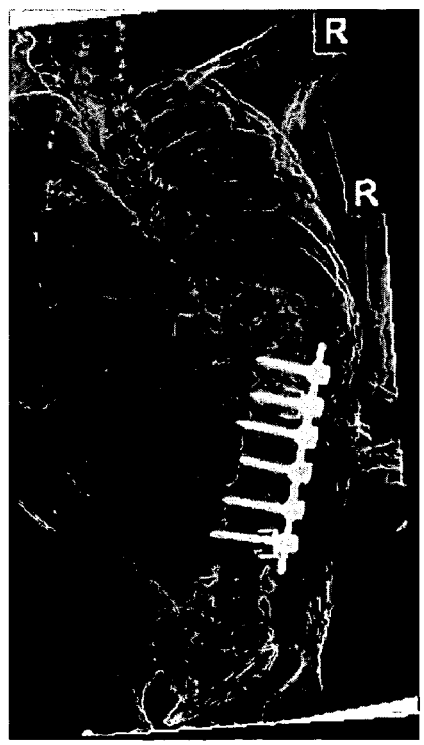
FIG. 30 illustrates a Minimum Intensity Projection Image.

FIG. 17 shows a simplified flow chart of another exemplary blending method that displays a minimum intensity pixel in the overlap section. In such methods, a pixel intensity of all of the pixels in overlap section of the first and second images is calculated on a pixel-by-pixel basis (Steps 106, 108). The pixel that is actually displayed in the overlap section will be the smaller of the measured pixel intensity of the overlapping corresponding pixels in the first image and the second image (Step 110). Such a method provides a minimization of some undesirable high intensity artifacts introduced by the imaging device (FIG. 30).

Figure 18:
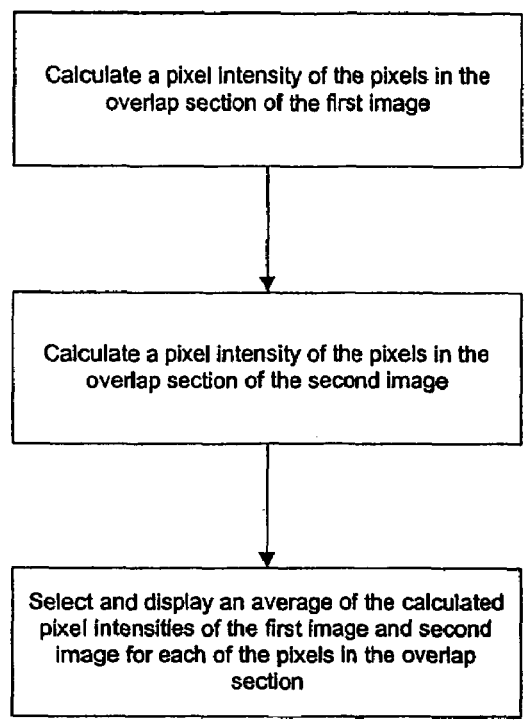
FIG. 18 is a flow chart illustrating yet another simplified method of blending an overlap section of superposed first and second images using an average intensity pixel.

FIG. 18 shows a simplified flow chart of yet another exemplary blending method that displays a pixel having an average intensity value of the pixel intensities from the corresponding pixels in the first and second images. In such methods, a pixel intensity of all of the pixels in overlap section of the first and second images is calculated on a pixel-by-pixel basis (Steps 112, 114). The pixel that is actually displayed in the overlap section will be the average of the measured pixel intensity of the corresponding overlapping pixels in the first image and the second image (Step 116). Such a method provides a means to show a very smooth transition between the images.

Figure 19A:
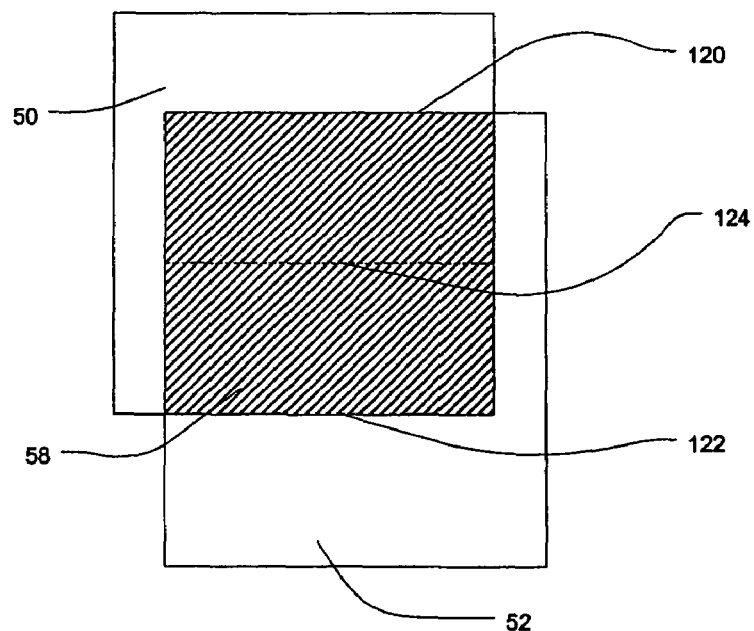
FIG. 19A is a simplified view of an overlap section of the stitched image.
Figure 19B:
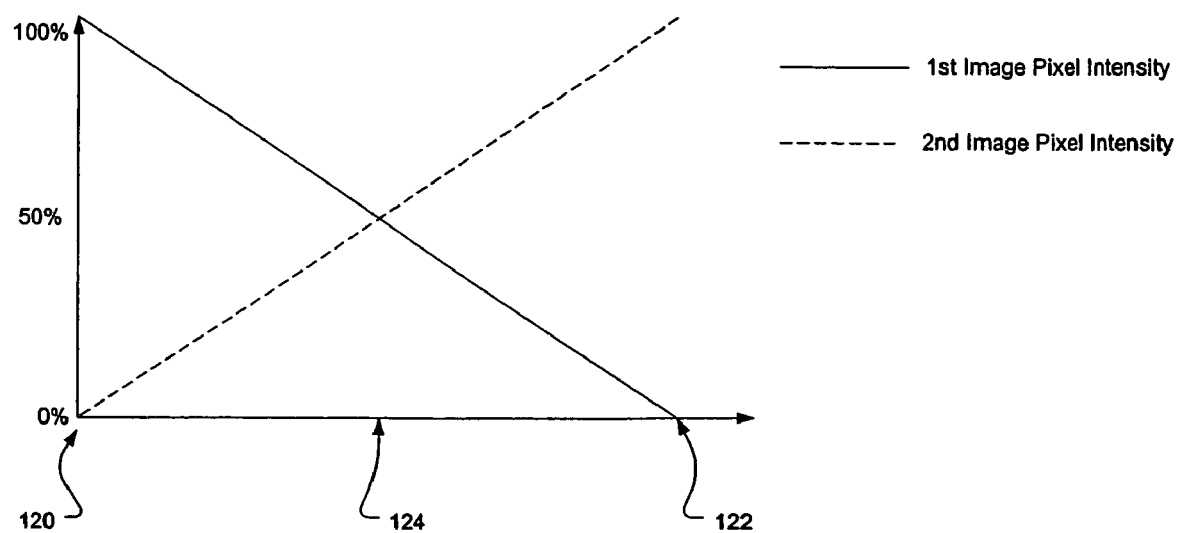
FIG. 19B is a graph illustrating an exemplary linear smooth transition in the overlap section between the first image and second image.
Figure 19C:
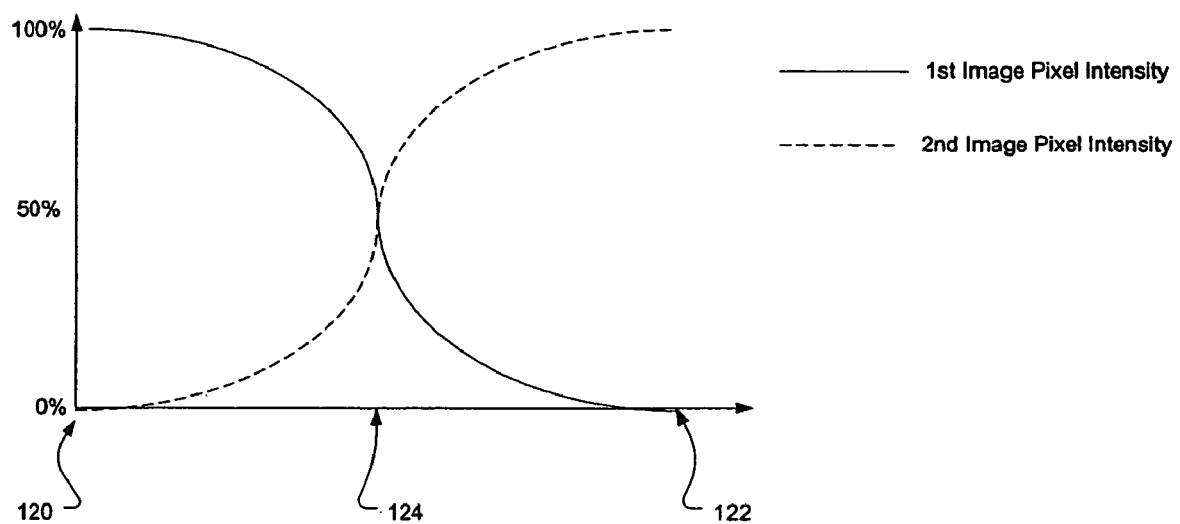
FIG. 19C is a graph illustration an exemplary nonlinear smooth transition overlap section between the first image and second image.

The present invention also provides a method of blending the overlap section in which the overlap section has a smooth transition between the first image and second image. As shown schematically in FIG. 19A, the overlap section 58 has a first border or end 120 that is closer to an upper portion of the first image 50 and a second border or end 122 that is adjacent the lower portion of the second image 52. First border 120 will display a pixel intensity that is 100% from the first image and 0% from the second image. Similarly, second border 122 will have a pixel intensity that is 100% of the second image and 0% of the first image. Typically, the midway point 124 between the first border 120 and the second border 122 will be an average intensity of the first image and second image (e.g., 50% of the first image and 50% of the second image). For simplicity, FIG. 19A shows a first image and a second image that are not rotated. It should be appreciated however, that the blending methods can be used equally well with images that have been rotated In some embodiments, as shown in FIG. 19B, the pixel intensity of the points between the midway point 124 and the first and second borders can have a linear relationship between the pixel intensity of the corresponding pixels of the first image and second image. In other embodiments, as shown in FIG. 19C the pixel intensity of the points between the midway point 124 and the first and second borders can have a non-linear relationship between the pixel intensities of the first image and second image.

Figure 19D:
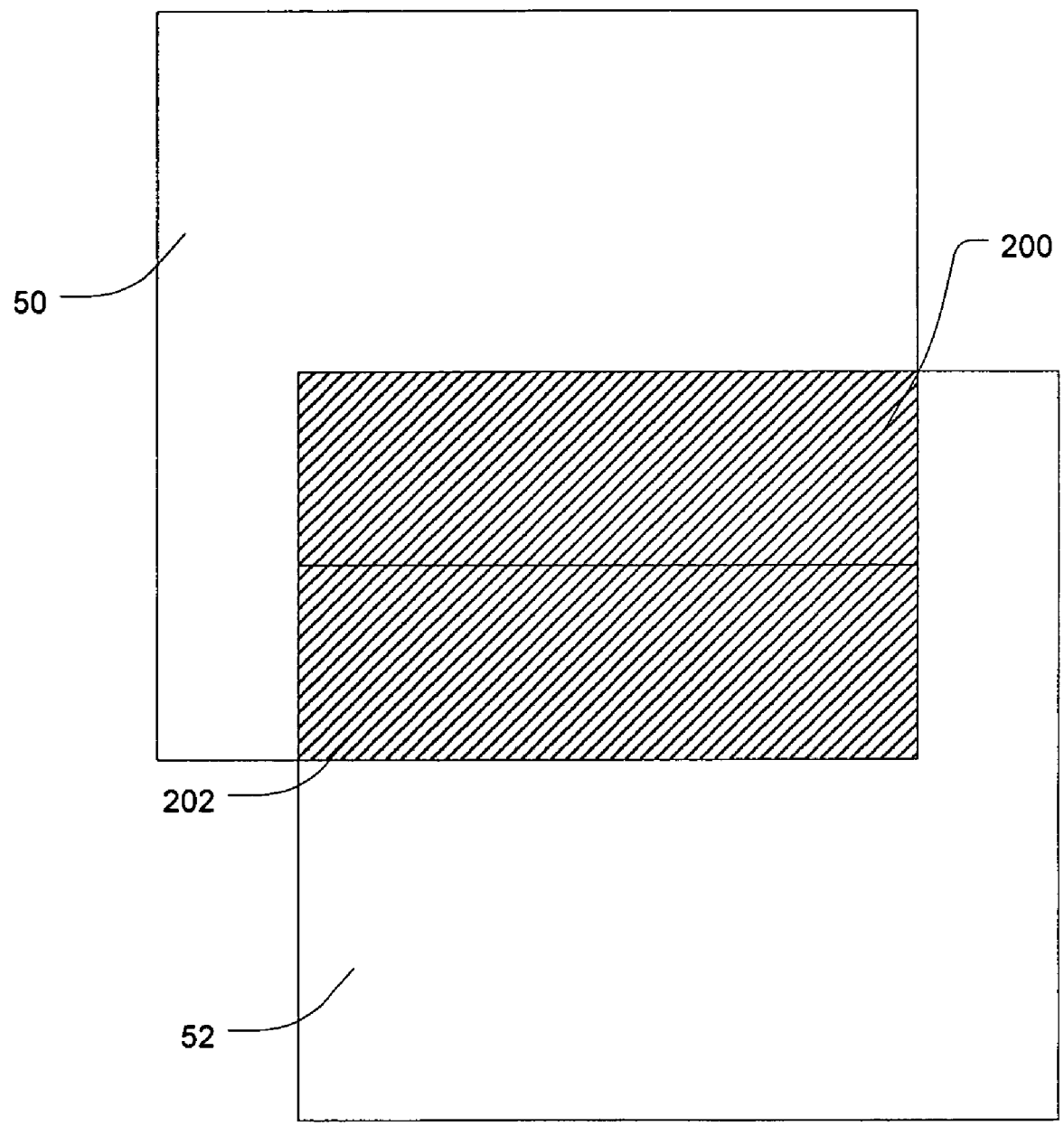
FIG. 19D illustrates a blending method in which a first region of the overlap section has the intensity scale of the first image and a second region of the overlap section has the intensity scale of the second image; optionally there may be a transition region between the first region and second region.

In yet another embodiment of blending, FIG. 19D shows an embodiment in which a first image 50 and second image 52 are overlapped. The overlap section is divided into two or more regions 200, 202. The first region 200 will have the intensity scale of the first image 50 and the second region 202 will have the intensity scale of the second image 52. In other embodiments, there may be a transition region (not shown) between the first region 200 and second region 202, in which the transition region has some blending (average pixel intensity, gradual change, etc.) of the intensity scale of the first image 50 and the second image 52.

Figure 20:
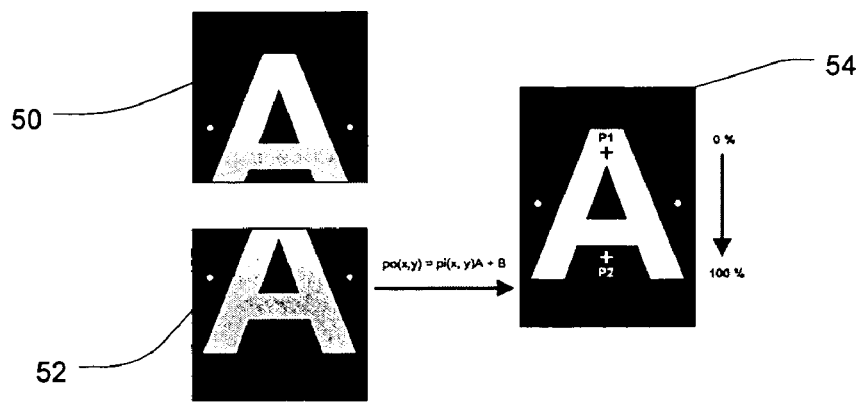
FIG. 20 illustrates brightness/contrast matching of two images that have a gradual change of brightness/contrast.

FIG. 20 illustrates a method of brightness/contrast matching and blending that can be implemented inside and outside of the overlap section, in which one or more of the images has a gradual change of brightness/contrast. The gradual change of brightness/contrast is typically caused by the differing absorption properties of different anatomies in the images, but may be caused by any number of reasons. In such methods, in addition to having to define the gain and offset of the method shown in FIG. 12 so as to provide a consistent image intensity between the two images, the operator (or software) may define a transition region in which the degree of gain and offset is blended. The operator may manually select points P1 and P2 or the region of interest for the transition region. The vertical portion of image 50 above P1 and the vertical portions below P2 will have the intensity adjusted as described above, but the portions of the images 50, 52 between P1 and P2 may be applied with intensity change where the degrees of gain and offset are gradually changed from 0% to 100%. P1 and P2 may be aligned in any directions that provide optimal variation between the two images. The blending may be done smoothly on a line by line basis along the P1, P2 axis. The blending function can be linear, or any other continuous function that results in an unchanged value at P1 and at P2. (See also FIG. 11E which illustrates a stitched image in which first and second points P1 and P2 are chosen and the brightness/contrast of the area between the points P1, P2 are adjusted).

Figure 20A:
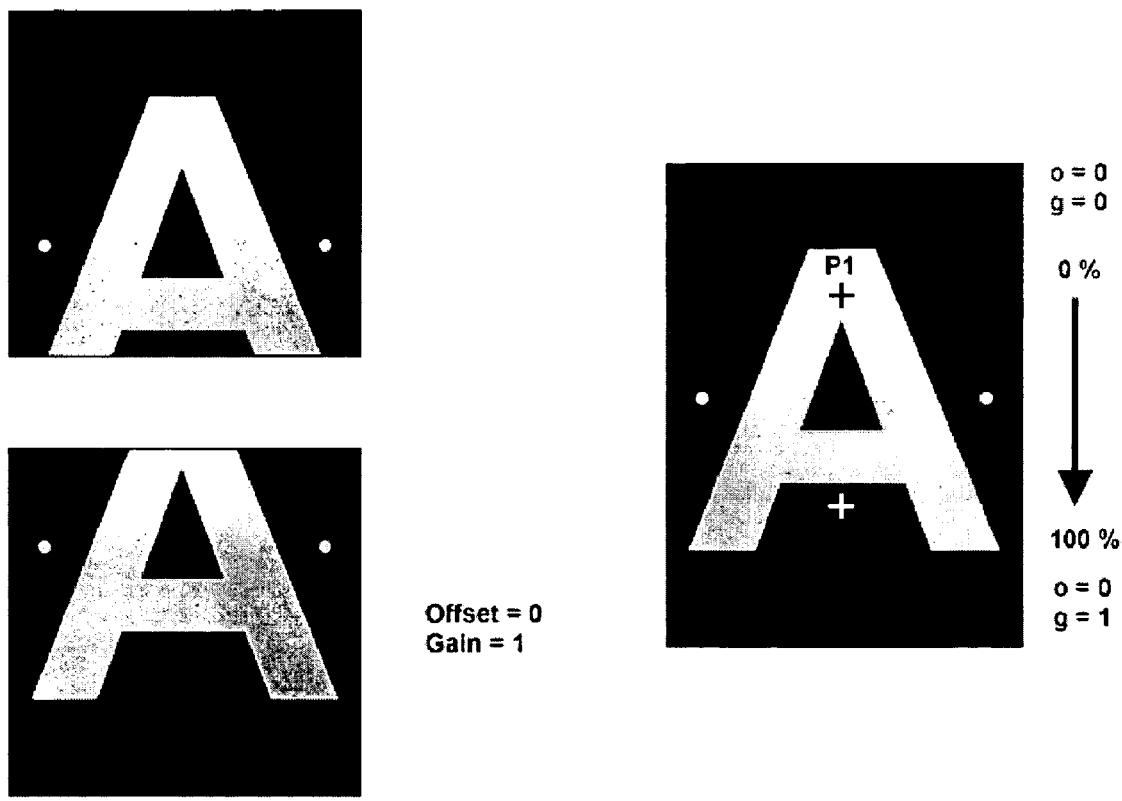
FIG. 20A illustrates one specific method of brightness/contrast matching of two images that have a gradual change of brightness/contrast.

FIGS. 20A and 20B demonstrate how the method in FIG. 20 is used in the case of gain=1 and offset=0 with different distances between P1 and P2. Note that P1 and P2 can be located outside of the overlap section, if desired, and the scaling may be applied to a non-overlapping section of image 50, 52.

Figure 21:
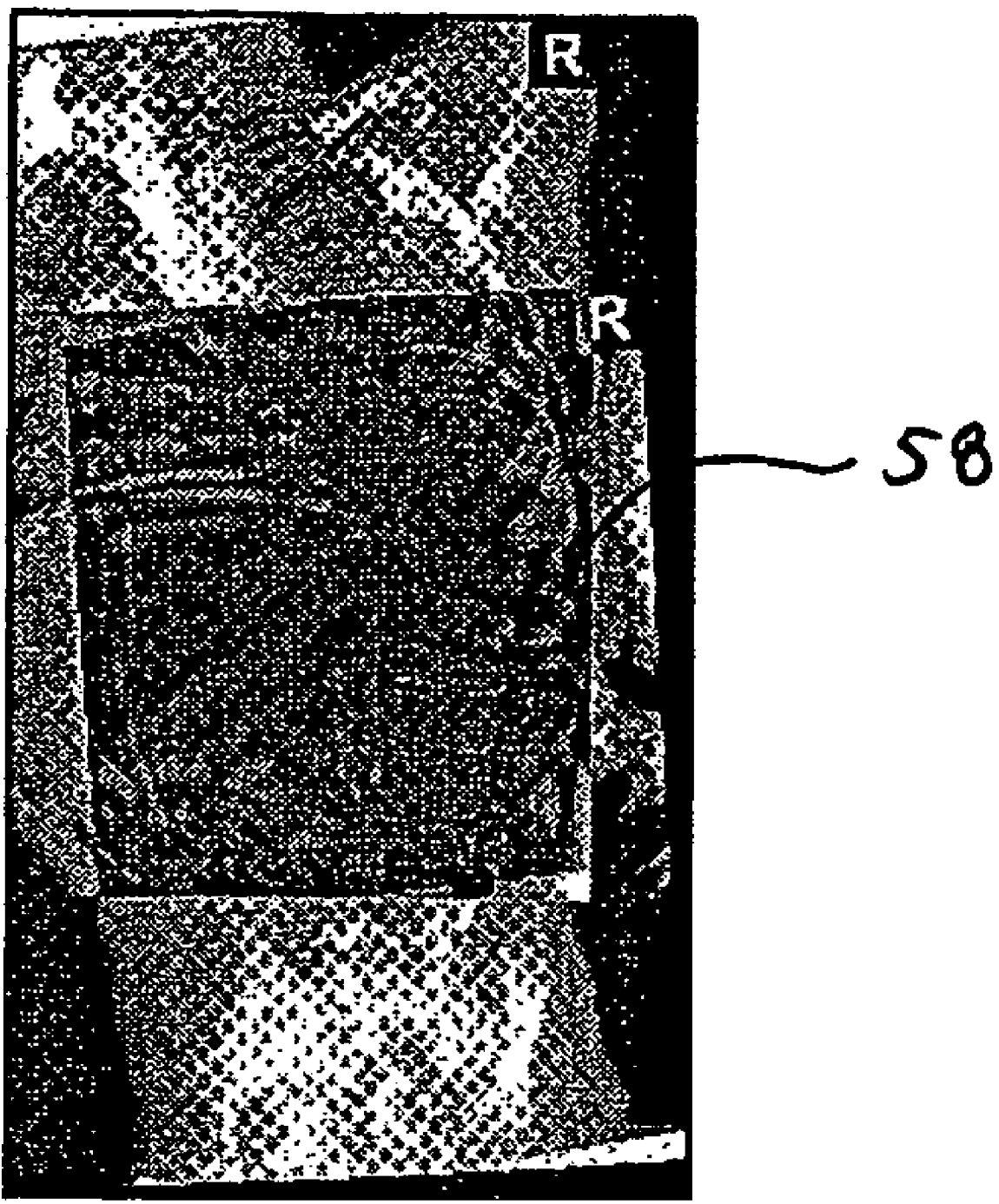
FIG. 21 illustrates an absolute difference validation method for visually indicating miss-registration of the images in the overlap section.

As shown in FIG. 21, the present invention also can provide an "absolute difference" method to validate the registration of the image and to provides direct visual feedback in real-time so as to enhance the visibility of any miss-registration of the images. In the absolute difference method the software will subtract the pixel intensity of the first image from the pixel intensity of the second image, or vice versa. If the first image and second image in the overlap section are perfectly aligned, the operator will see only black in the overlap section since the absolute difference will be zero. Generally, however, the operator will see some black and non-black pixel intensities in areas that are not perfectly aligned due to rotation or translation of the patient during imaging. Thus, the absolute difference method will be able to provide a real-time visual indication of when the images are substantially aligned. If there is a miss-registration, each image may be rotated or translated with real-time feedback until an acceptable match is obtained.

After the first and second images have been aligned and blended using any combination of the above described methods, the resulting composite image can be saved as a separate DICOM image file that can be transferred for analysis by the examining physician.

Figure 22:
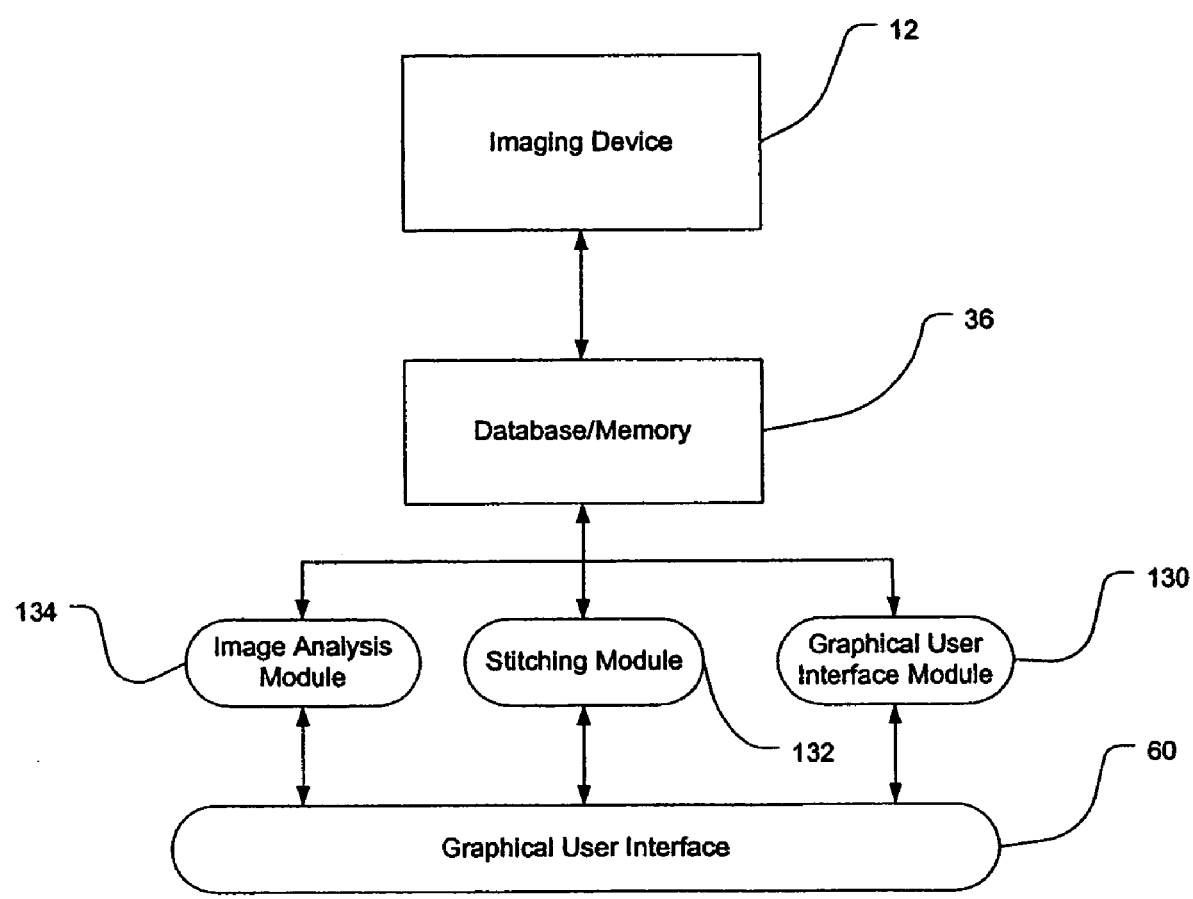
FIG. 22 illustrates software modules of the present invention.

FIG. 22 depicts the software modules according to an embodiment of the present invention. For example, according to an embodiment of the present invention, software modules implementing the functionality of the present invention may be stored in storage subsystem 36 (FIG. 2). These software modules may be executed by processor(s) 50 of computer system 22. In a distributed environment, the software modules may be stored on a plurality of computer systems and executed by processors of the plurality of computer systems.

An exemplary data flow through the software of the present invention will now be described. As shown in FIG. 22, the software of the present invention typically includes a graphical user interface module 130, a stitching module 132, and an image analysis module 134. Image information is obtained with imaging device 12 and stored in memory 36 or other computer readable medium. The software modules can obtain the image data from the computer readable medium and display the selected images on graphic user interface 60. After the first image is displayed on the graphical user interface 60, the operator can use the graphical user interface module 130 to zoom in or out of the image by multiplying the slice dimension by a chosen zoom factor and resample the image from the original dataset. Moreover, if the operator desires to pan the displayed image, using known methods, the operator can use the graphical interface module 130 to cause a 2D transformation of the image by moving the center of the displayed image to a desired point on the graphical user interface.

After a second image is obtained from the computer storage, the first and second images can be marked with a fiducial. The stitching module 132 will typically allow the operator to choose which types of marker will be used to mark the images. As described above, in certain imaging situations it may be preferable to use one stitching method (e.g., one point, two points, lines, or the like) over the other markers. The stitching module 132 allows the operator to select and place a marker on each of the images. After the markers have been placed on each of the images, at least one of the images can be translated and possibly rotated until the markers are substantially aligned.

Image translation can be performed to the image (x, y) by adding translation amounts to the coordinates of the points. For the new position of image P'(x, y), the following formula can be used to move each point P(x, y) by $d_x$ units parallel to the x axis and by $d_y$ units parallel to they axis.

$$x'=x+d_x, y'=y+d_y$$

Image rotation about a chosen origin, through an angle θ can be performed to the image (x, y) by the following formula.

$$x'=x\cdot\cos\theta-y\cdot\sin\theta, y'=x\cdot\sin\theta-y\cdot\cos\theta$$

After the images have been moved and substantially aligned, stitching module 132 can be configured to blend the overlap section of the first and second images to improve visualization of the stitched image. The stitching module 132 can include a variety of blending algorithms so as to allow the operator flexibility in choosing how to align and blend the first and second images together.

In a specific embodiment, once the images have been substantially aligned, five blending formulas can be selectively used to calculate the overlap section. For every point P'(x, y) inside the overlapped area, one of the following five blending formulas can be used to produce the new image from two source images, $P_1(x, y)$ and $P_2(x, y)$. It should be appreciated however, that these formulas are merely examples, and other formulas can be used to blend the overlap section.

Average—averaged value between two images.

$$P'(x, y) = \left[\frac{P_1(x, y) + P_2(x, y)}{2}\right]$$

Absolute Difference—absolute difference value between two images.

$$P'(x, y) = |P_1(x, y) - P_2(x, y)|$$

Maximum Intensity Projection—on a pixel-by-pixel basis, selects the densest values from the two images.

$$P'(x, y) = \begin{cases} P_1(x, y), & \text{if } P_1(x, y) \geq P_2(x, y) \\ P_2(x, y), & \text{if } P_2(x, y) > P_1(x, y) \end{cases}$$

MinIP—on a pixel-by-pixel basis, selects the least dense values from the two images.

$$P'(x, y) = \begin{cases} P_1(x, y), & \text{if } P_2(x, y) \geq P_1(x, y) \\ P_2(x, y), & \text{if } P_1(x, y) > P_2(x, y) \end{cases}$$

Blend—smooth transition between two source images
  M=size of overlapped area parallel to the x axis $0 \leq i \leq M$
  N=size of overlapped area parallel to the y axis $0 \leq i \leq N$
  In the image space where:
  $P_{1xb}, P_{2xb}$=Beginning of the source image 1 and 2 parallel to the x axis
  $P_{1xe}, P_{2xe}$=Ending of the source image 1 and 2 parallel to the x axis
  $P_{1yb}, P_{2yb}$=Beginning of the source image 1 and 2 parallel to the y axis
  $P_{1ye}, P^{2ye}$=Ending of the source image 1 and 2 parallel to they axis $$d_1 = \min \begin{cases} i - p_{1xb} \\ j - p_{1yb} \\ p_{1xe} - i \\ p_{1ye} - j \end{cases} \quad d_2 = \min \begin{cases} i - p_{2xb} \\ j - p_{2yb} \\ p_{2xe} - i \\ p_{2ye} - j \end{cases}$$

$$W_1 = \frac{d_1}{d_1 + d_2}, \quad W_2 = \frac{d_2}{d_1 + d_2}$$

$$P'(i, j) = W_1 P_1(i, j) + W_2 P_2(i, j)$$

After the images have been stitched and blended, the image can be stored and the examining physician can examine the image. As noted above, in scoliosis evaluation, the examining physician needs to measure the angle of the patient's spine (i.e. Cobb's angle). In such uses, the image analysis module 134 can include an algorithm to measure the angle of the patient's spine. In a particular embodiment, the operator can draw a line in the disk space between two thoracic vertebrae parallel to the inferior surface of the upper vertebrae and a second line in the disk space between two lumbar vertebrae, parallel to the inferior surface of the upper lumbar vertebrae. The program can then automatically draw a line perpendicular to each of the two operator drawn lines and the image analysis module 134 can calculate the angle at the intersection. The measured angle can then be recorded and displayed and used as a reference for treatment recommendation. One specific formula for calculating the angle between two given lines $L_1$ and $L_2$:

$$\theta = \tan^{-1}\left(\frac{L_{1y1} - L_{1y2}}{L_{1x1} - L_{1x2}}\right) - \tan^{-1}\left(\frac{L_{2y1} - L_{2y2}}{L_{2x1} - L_{2x2}}\right)$$

Where:
  $L_{1x1}, L_{2x1}$=Start point of line 1 and 2 parallel to the x axis
  $L_{1x2}, L_{2x2}$=End point of line 1 and 2 parallel to the x axis
  $L_{1y1}, L_{2y1}$=Start point of line 1 and 2 parallel to the y axis
  $L_{1y2}, L_{2y2}$=End point of line 1 and 2 parallel to they axis Applicants have found that such an image analysis module has dramatically reduced the errors introduced into the measurement of the angle of the spine (i.e., Cobb angle measurement) such that the introduction of errors into the angle measurement was below 1°. It should be appreciated, that the image analysis module 134 can contain a plurality of algorithms to measure anatomic conditions in the stitched image. For example, in addition to or instead of the line angle measurement algorithm, the image analysis module can include means to measure lengths, distances between anatomic features, and the like.

As illustrated in FIGS. 23-28, the present invention provides graphical user interfaces for manipulating radiographic images. While the following discussion describes one exemplary graphical user interface and methods, it should be appreciated that the present invention can take many different forms that are not described herein, and the present invention is not limited to such an example.

FIG. 4 illustrates an exemplary tool palette of the present invention. The tool palette can include icons to (1) manipulate the image such as zoom, pan, change the window level, inverse color, and (2) tools to stitch the images such as stitch tools and swap images, adjust image. It should be appreciated that other combinations of other conventional icons can be incorporated into the tool palette without departing from the scope of the present invention. All functions available on the tool palette 64 can also be available in a pull down menu of the main menu bar. This redundancy allows the operator to employ fewer mouse clicks to reach frequently used commands.

Figure 23:
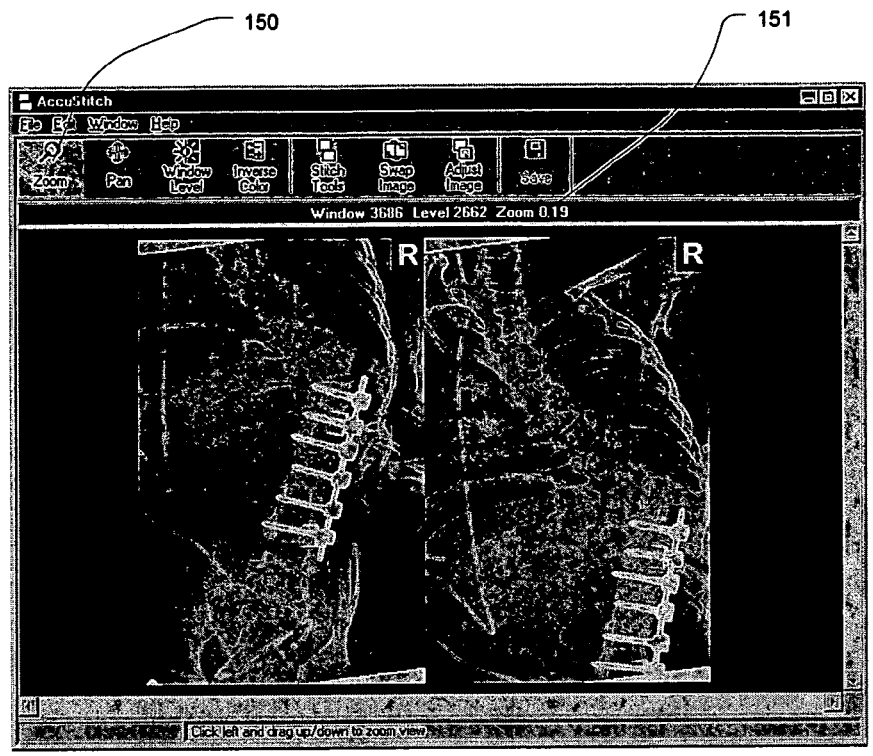
FIG. 23 illustrates a zoom icon of the present invention.

As shown in FIG. 23, selecting the zoom icon 150 will magnify the image in real time. The zoom factor can be changed by clicking on a left mouse button or by depressing selected buttons on a keyboard (typically the up arrow and down arrow). The current zoom factor 151 will typically be displayed on the image window to inform the operator of the current zoom factor.

Figure 24:
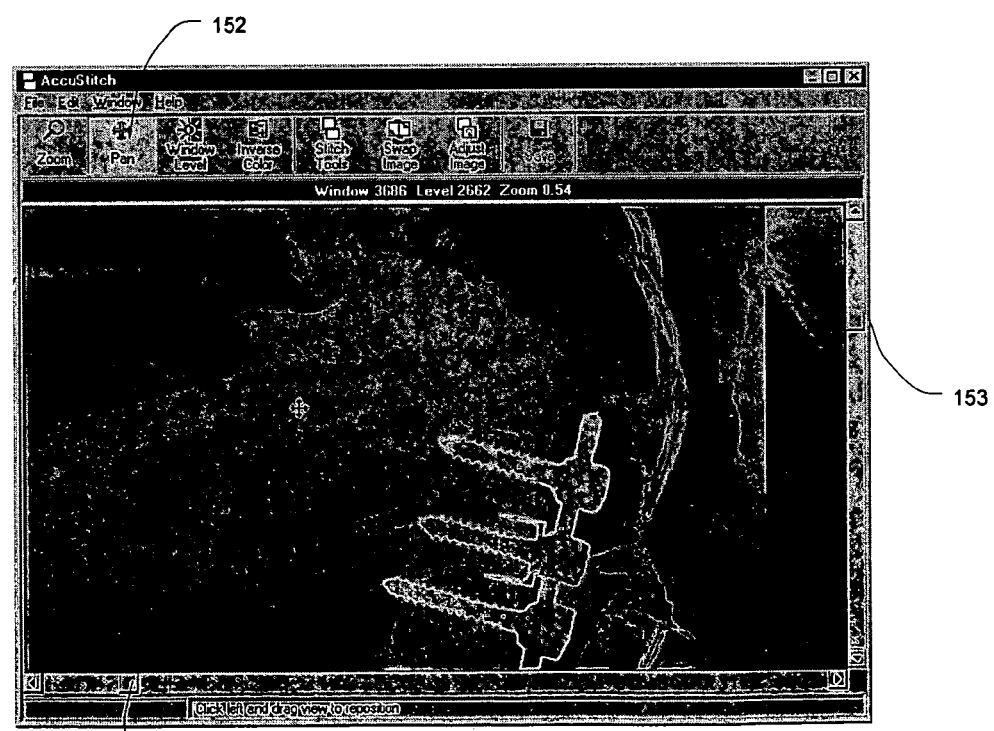
FIG. 24 illustrates a pan icon of the present invention.

As shown in FIG. 24, the operator can select the pan icon 152 and pan up, down, left, and right within the image so as to display a desired area. The operator can use the mouse and/or click on the scrollbars 153, 153' along the right and bottom of the image window to pan the images. Additionally, the operator can select the icon and use the arrow keys on the keyboard to pan through the selected image.

Figure 25:
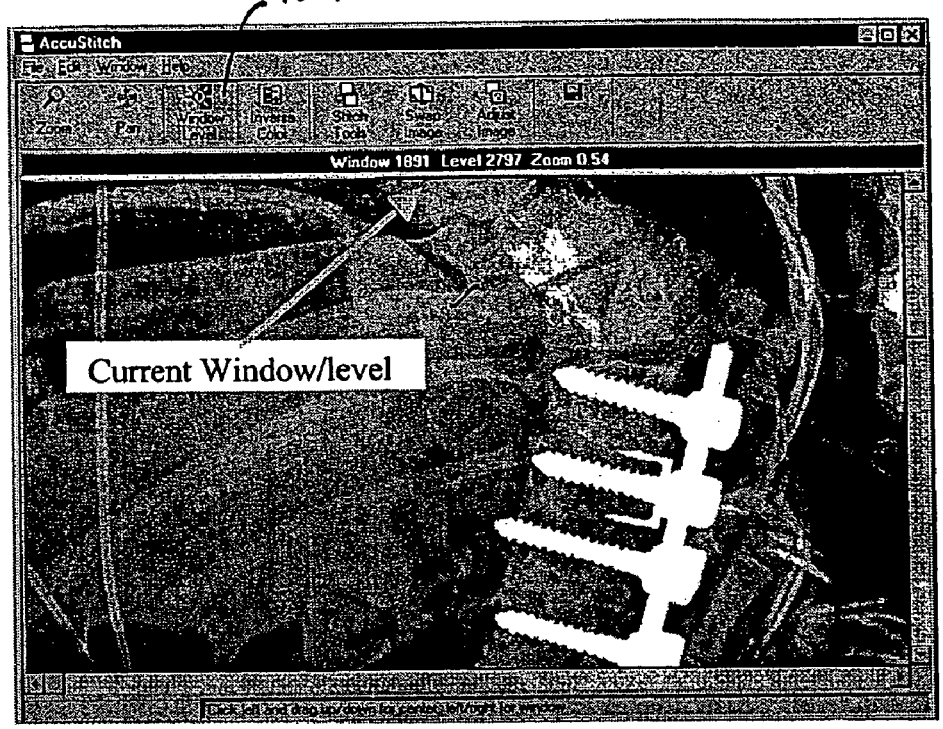
FIG. 25 illustrates a window level icon of the present invention.

Selection of the window level icon 154, as shown in FIG. 25 can be used to change the contrast and brightness of the image. The window level can be displayed on the image window. Adjustment of the window level can be done with the mouse or finely adjusted with the keyboard keys.

Figure 26:
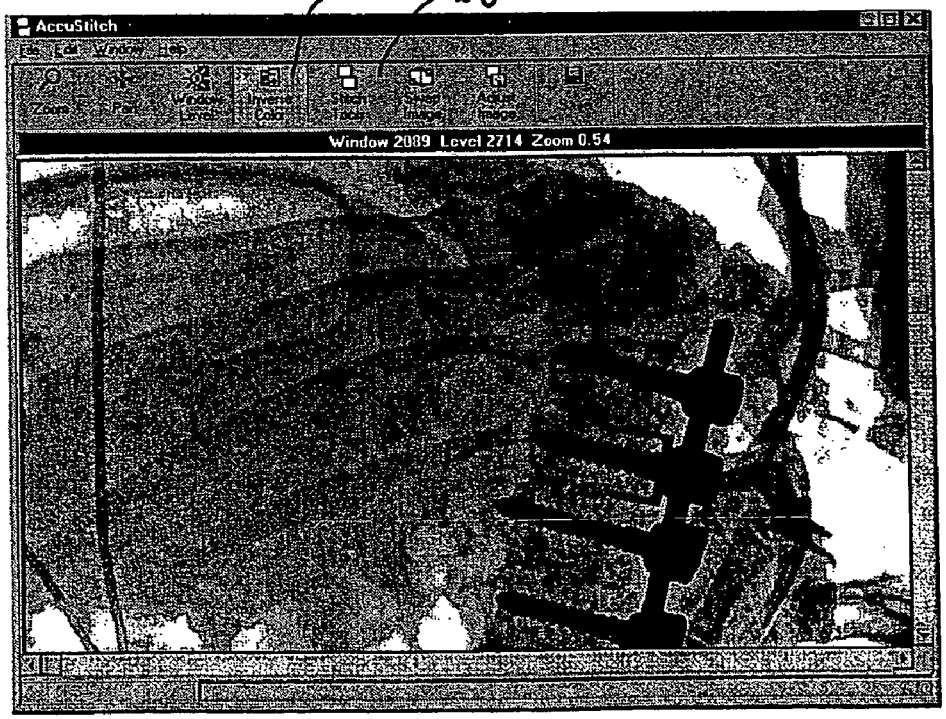
FIG. 26 illustrates an inverse color icon of the present invention.

As shown in FIG. 26, selecting the inverse color icon 156 inverses the color table from black to white, and vice versa. This allows for preferences and conventions in reading images. It is generally recognized that given a certain background intensity, bright features are easier to observe than dark ones, and reversing the scale can aid the operator who may be choosing either dark or bright anatomic landmarks.

Figure 27:
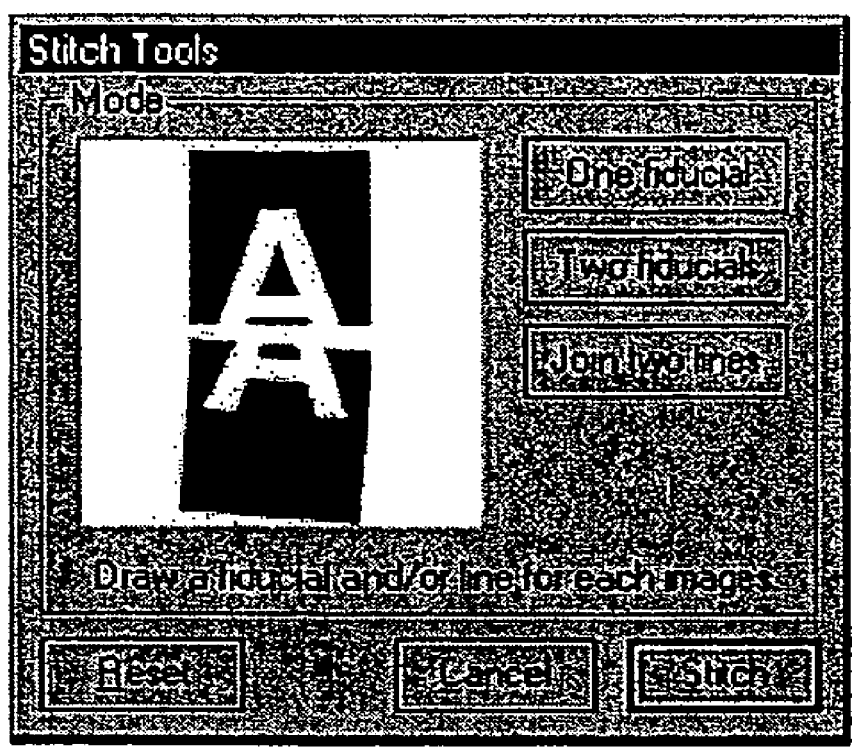
FIG. 27 illustrates a Stitch Tool Dialog Menu of the present invention.

Selecting the Stitch tools icon 158 (FIG. 26) will bring up a Stitch Tool Dialog 160. As shown in FIG. 27, the Stitch Tool Dialog 160, the operator can select the type of markers so use to mark the image (e.g., one fiducial, two fiducials, or lines). Selection of the type of marker to use will depend primarily on the anatomic landmarks available in the images. Selecting one of the icons will allow the operator to mark the images, as described above in reference to FIGS. 6A-10B. After the fiducials have been placed in the appropriate places on the image, the operator can actuate the Stitch icon 158 to begin the stitching process.

After the image has been stitched, the operator can adjust the position and rotation of the stitched image by activating the Adjust Image icon 162. In exemplary embodiments, the image can be moved one pixel at a time using the keyboard—typically the left, right, up and down keys. To change the rotation, the operator can depress the Page Up and Page down keys. If the operator depresses the "Shift" key on the keyboard in combination with the other keys, the movement will be increase by a factor of ten. Thus, if the Shift key is held down while depressing the left key, the image will move ten pixels. Similarly, if the Shift key is held down in combination with the Page Down key, the stitched image will rotate ten degrees.

Figure 28:
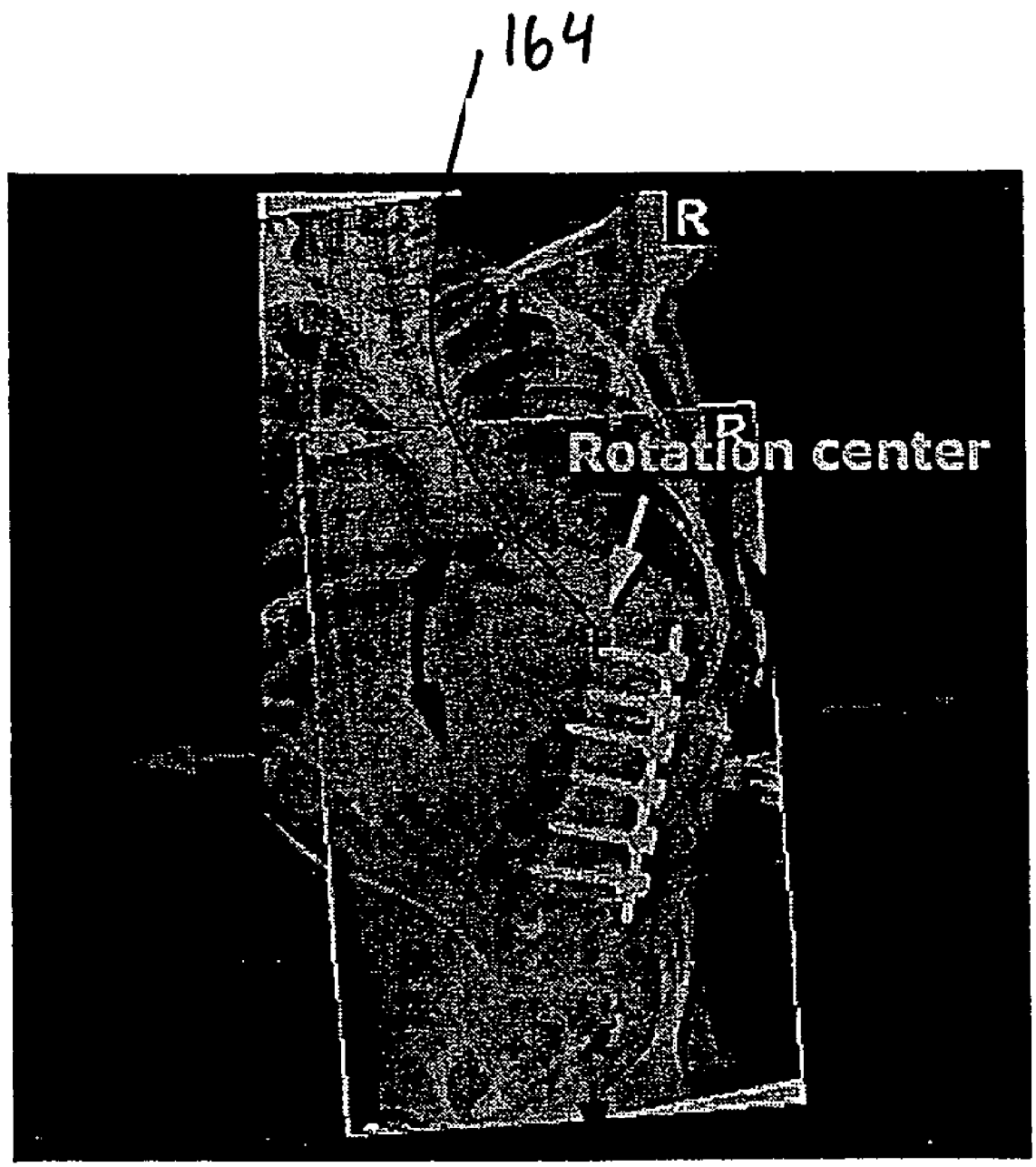
FIG. 28 illustrates changing the center of rotation of the stitched image.

As shown in FIG. 28, to move the center of rotation of the stitched image, a marker 164 in the picture can be moved by clicking and dragging the marker to a new center of rotation. Typically, the marker can be dragged to another position by holding the mouse button down and releasing the button when the cross-mark is at the desired center of rotation.

While the above disclosure as described herein is focused on stitching digitized radiographic images, it should be appreciated that the present invention is equally applicable to CT, MRI, nuclear imaging, ultrasound, aerial and panoramic photography, and other image datasets. Additionally, while the above invention is directed mainly to stitching of medical images, the present invention can be used for editing digital photographs, and the like.

What is claimed is:

1. A computer-implemented method comprising:
   obtaining a plurality of projection images, each of the projection images comprising one or more objects that have a known absorption value;
   measuring and comparing by a processor, intensity levels of the objects in the projection images; and
   scaling, by the processor, an intensity of the projection images so that the objects in each of the projection images have an intensity that correlates to its known absorption value.

2. The method of claim 1 wherein after scaling of the intensity of the projection images each of the objects in the projection images have substantially matching intensity levels.

3. The method of claim 1 comprising stitching the plurality of projection images together.

4. The method of claim 3 wherein stitching is carried out before scaling.

5. The method of claim 3 wherein stitching is carried out after scaling.

6. The method of claim 1 wherein the one or more objects having the known absorption value are positioned so as to not overlap any subject tissue of the projection image.

7. The method of claim 1 wherein measuring the intensity level is automatically carried out by software.

\* \* \* \* \*

UNITED STATES PATENT AND TRADEMARK OFFICE
CERTIFICATE OF CORRECTION

PATENT NO. : 7,650,044 B2  Page 1 of 1
APPLICATION NO. : 11/067594
DATED : January 19, 2010
INVENTOR(S) : Kreang-Arekul et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1321 days.

Signed and Sealed this

Twenty-eighth Day of December, 2010

David J. Kappos
*Director of the United States Patent and Trademark Office*